(12) United States Patent
Kobayashi et al.

(10) Patent No.: US 6,712,053 B2
(45) Date of Patent: Mar. 30, 2004

(54) CONTROL SYSTEM FOR INTERNAL COMBUSTION ENGINE

(75) Inventors: Kazuo Kobayashi, Nagoya (JP); Hiroshi Haraguchi, Kariya (JP); Toshio Kondo, Kariya (JP); Sumiko Kohira, Kariya (JP)

(73) Assignee: Denso Corporation, Kariya (JP)

( * ) Notice: Subject to any disclaimer, the term of this patent is extended or adjusted under 35 U.S.C. 154(b) by 34 days.

(21) Appl. No.: 10/229,284

(22) Filed: Aug. 28, 2002

(65) Prior Publication Data

US 2003/0116150 A1 Jun. 26, 2003

(30) Foreign Application Priority Data

Dec. 21, 2001  (JP) .......................................... 2001-389024

(51) Int. Cl.$^7$ ................................................ F02D 41/00
(52) U.S. Cl. ................... 123/674; 123/688; 123/698; 123/703; 123/568.19; 60/285
(58) Field of Search .................... 123/674, 688, 123/698, 703, 568.11, 568.19; 60/278, 285; 73/118.1, 118.2

(56) References Cited

U.S. PATENT DOCUMENTS

| | | | |
|---|---|---|---|
| 5,381,775 A | | 1/1995 | Birk et al. .................. 123/679 |
| 6,550,451 B1 | * | 4/2003 | Muller et al. .......... 123/406.45 |
| 6,594,988 B2 | * | 7/2003 | Takubo et al. ................ 60/285 |
| 2002/0139360 A1 | * | 10/2002 | Sato et al. .................. 123/698 |

\* cited by examiner

*Primary Examiner*—Mahmoud Gimie
*Assistant Examiner*—Hai Huynh
(74) *Attorney, Agent, or Firm*—Nixon & Vanderhye P.C.

(57) ABSTRACT

An $O_2$ amount in the intake air is determined based on a fresh air and an EGR gas. A consumed $O_2$ amount is determined with a command injection amount Qr. Then, the consumed $O_2$ amount is subtracted from the $O_2$ amount in the intake air to obtain an exhaust $O_2$ amount. An exhaust $O_2$ concentration is estimated based on the exhaust $O_2$ amount. According to the invention, the system is not affected by a delay for the exhaust gas to reach an $O_2$ sensor and a delay of the chemical reaction in the $O_2$ sensor. Therefore, the exhaust $O_2$ concentration can be highly precisely estimated compare to the case in which the exhaust $O_2$ concentration is detected by the $O_2$ sensor.

16 Claims, 25 Drawing Sheets

NLEARN MAP

| ne \ Qc | 1000 | 1800 | 2200 | |
|---|---|---|---|---|
| 7.5 | 1 | 2 | 3 | 4 |
| 15.0 | 5 | 6 | 7 | 8 |
| 22.5 | 9 | 10 | 11 | 12 |
|  | 13 | 14 | 15 | 16 |

FIG. 27A
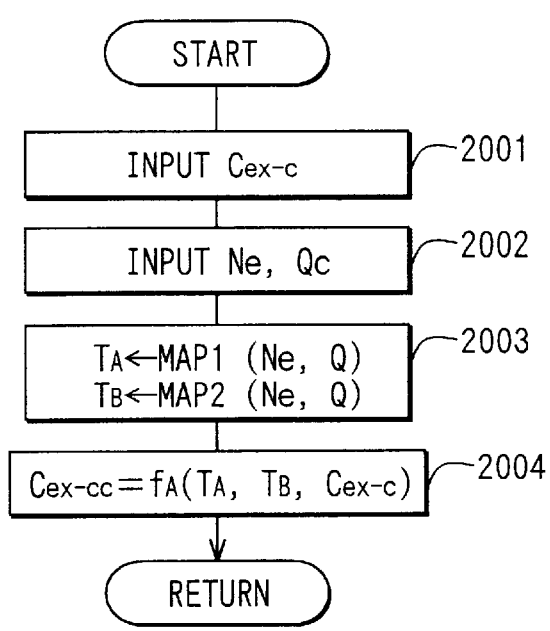
FIG. 27B
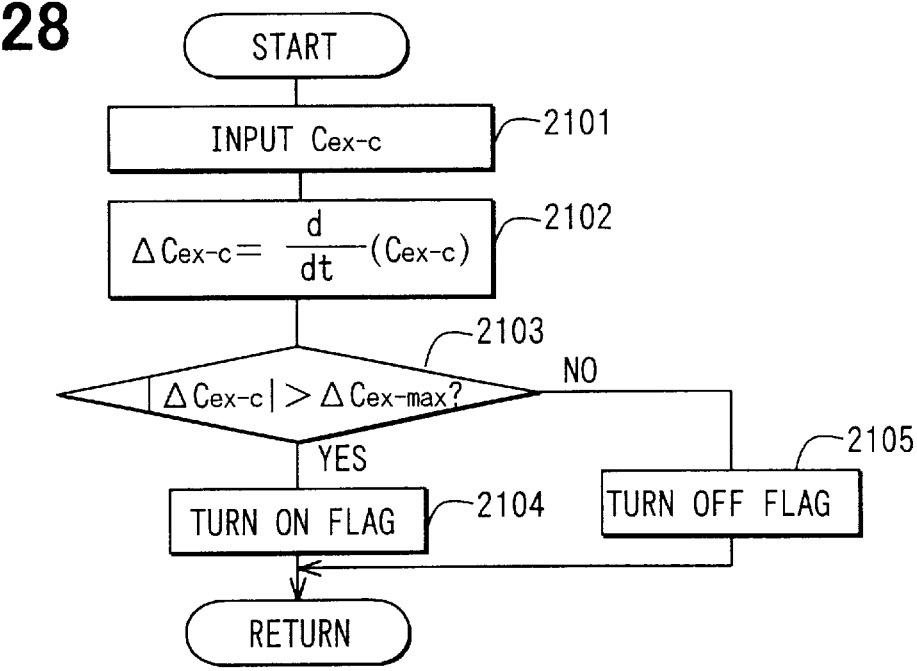
FIG. 28

CONTROL SYSTEM FOR INTERNAL COMBUSTION ENGINE

CROSS REFERENCE TO RELATED APPLICATION

This application is based on Japanese Patent Applications No. 2001-55931 filed on Feb. 28, 2001, and No. 2001-389024 filed on Dec. 21, 2001 the contents of which are incorporated herein by reference.

BACKGROUND OF THE INVENTION

1. Field of the Invention

The present invention relates to a control system for an internal combustion engine.

2. Description of Related Art

In recent years, the regulations against the exhaust gas of a Diesel engine have been more and more strict to enhance the necessities for highly precise EGR controls and injection amount controls. In the EGR controls, for example, there has been mass-produced a method (for an airflow meter F/B control), in which the airflow to be sucked into a cylinder is feedback-controlled to a target value by measuring it with an airflow meter disposed in an intake line, so as to enhance the precision in the EGR ratio.

In a transient state for acceleration or deceleration, however, the actual airflow into the cylinder and the airflow measured by the airflow meter are different so that the so-called "model-based control" has been investigated in various manners considering the transmission delay of air. In this model-based control, the air to flow in the transient state into the cylinder is estimated by calculating a transmission delay in the air physically or in a transmission function on the basis of the airflow signal measured by the airflow meter.

However, the EGR amount recirculated from the EGR passage is highly varied with the back pressure on the EGR upstream side (i.e., on the exit side of the cylinder). Especially in the turbo engine, the back pressure changes highly transiently so that the EGR amount changes to cause an error in the EGR ratio. Especially in the variable turbo engine, the back pressure change is so seriously high that the EGR ratio cannot be precisely controlled by the airflow meter F/B control of the prior art or by the model-based control on the former thereby to fail to prevent the adverse effects such as the smoke emission.

In the case of the Diesel engine for the injection amount control, moreover, the injection amount is made different from a command value by the manufacture tolerance or aging of a fuel injection device so that the fuel becomes excessive or short to cause problems of the smoke emission or the torque shortage. In order to solve these problems, there has been investigated a method for feedback-controlling a fuel amount with an exhaust $O_2$ concentration by providing the exhaust line with an $O_2$ sensor for detecting the exhaust concentration. With the $O_2$ sensor in the exhaust line, however, a time delay occurs till the exhaust gas reaches the position of the $O_2$ sensor. With the delay in the chemical reaction of the $O_2$ sensor itself, moreover, the actual exhaust $O_2$ concentration and the exhaust $O_2$ concentration detected by the $O_2$ sensor have been different to cause a problem that the control precision especially at the transient time drastically drops.

SUMMARY OF THE INVENTION

It is an object of the present invention to provide an internal combustion engine control system that is capable of estimating an exhaust $O_2$ concentration precisely.

It is another object of the present invention to provide an internal combustion engine control system that is capable of performing an adequate EGR control and an injection amount control.

The present invention has been conceived on the basis of the background thus far described and has an object to realize an EGR control and an injection amount control, which are excellent in responsibility and highly precise.

According to the present invention, the exhaust $O_2$ concentration of each combustion in a cylinder is estimated by using an intake airflow signal outputted from the intake measuring means, an intake pressure signal outputted from the intake pressure sensor, and command injection amount information calculated by the command injection amount calculating means, and at least one of an EGR valve and the fuel injection amount is controlled in accordance with the estimated exhaust $O_2$ concentration.

By using the intake pressure signal, according to this construction, the total amount of air to enter the cylinder can be detected, and the fresh airflow (i.e., the airflow containing no EGR gas) of the intake passage can be highly precisely detected with the intake airflow signal and the intake pressure signal. From the total amount of air and the amount of fresh air into the intake passage, it is possible to determine the amount of EGR gas into the intake passage. By adding the command injection amount information, moreover, it is possible to estimate the exhaust $O_2$ concentration after each injection highly precisely. According to this method, the exhaust $O_2$ concentration can be estimated before it is actually detected by the sensor, so that the method can control in high responsibility when used for the injection amount control or the EGR control.

The exhaust $O_2$ concentration estimating means may include consumed $O_2$ amount calculating means for calculating the $O_2$ amount to be consumed in terms with the command injection amount.

In this case, the exhaust $O_2$ concentration after injection can be calculated highly precisely by calculating the $O_2$ amount to be consumed with the command injection amount.

The exhaust $O_2$ concentration estimating means may calculate the $O_2$ amount in the gas (containing an EGR gas) to flow into the cylinder, by using the $O_2$ amount in the fresh air sucked into the intake passage and the $O_2$ amount in the EGR gas.

As a result, the $O_2$ amount to flow into the cylinder can be calculated highly precisely to improve the estimating precision of the exhaust $O_2$ concentration.

The exhaust $O_2$ concentration estimating means may calculate the $O_2$ amount in the EGR gas by using the estimated value of the past exhaust $O_2$ concentration calculated beforehand.

In this case, the detection delay is less influenced than the case in which the $O_2$ concentration of the exhaust gas is actually detected by the sensor, so that the exhaust $O_2$ concentration can be estimated highly precisely.

The control system may further comprise: an $O_2$ sensor disposed in an exhaust passage for detecting the actual exhaust $O_2$ concentration; and learning means for controlling the estimated value of the exhaust $O_2$ concentration so that the estimated value may coincide with the output value of the $O_2$ sensor.

As a result, the error of the exhaust $O_2$ concentration estimating means can be reduced to improve the estimating precision of the exhaust $O_2$ concentration.

The control system may further comprise: an $O_2$ sensor disposed in an exhaust passage for detecting the actual exhaust $O_2$ concentration; filtering means for correcting a time delay till the exhaust $O_2$ concentration of the exhaust gas discharged from the cylinder is detected by the $O_2$ sensor; and learning means for calculating a learning correction so that the estimated value of the exhaust $O_2$ concentration may coincide with the output value of the $O_2$ sensor, after filtered by the filtering means, to correct the estimated value of the exhaust $O_2$ concentration with the learning correction.

By executing the filtering, according to this construction, it is possible to detect the difference between the estimated value of the exhaust $O_2$ concentration and the actually measured value (or the output value of the $O_2$ sensor) highly precisely. As a result, the highly precise learning control can also be realized even at the transient time.

The updating of the learning correction may be inhibited under the condition in which the changing rate of the estimated exhaust $O_2$ concentration is no less than a predetermined value.

Generally, the learning is done at a steady time, but the driving state for the steady time is limited in the ordinary drive so that the steady state is difficult especially in the region of a low speed and a high load. In the case of a learning to the transient time, therefore, it is important how far the learning should be allowed.

The error occurs in the filtering when the signal of the exhaust $O_2$ concentration abruptly changes. Under the condition in which the changing rate of the estimated exhaust $O_2$ concentration is no less than a predetermined value, therefore, the filtering precision cannot be warranted so that the learning in the transient state within a predetermined range can be realized by inhibiting the updating of the learning correction.

Here, the estimated exhaust $O_2$ concentration, as termed herein, may be either the exhaust $O_2$ concentration of the exhaust gas to be discharged from the cylinder or the exhaust $O_2$ concentration after filtered.

The dead time and the time constant till the exhaust gas discharged from the cylinder reaches the $O_2$ sensor may be detected from the output value of the $O_2$ sensor when the injection amount in a steady state is finely changed.

The dead time and the time constant or the elements of the filtering are adjusted in advance for every driving conditions of the internal combustion engine but can desirably be corrected during the drive because of dispersions in the internal combustion engine and the $O_2$ sensor. According to the present invention, on the contrary, the exhaust $O_2$ concentration can be finely changed to detect how late the $O_2$ sensor exhibits the reaction, by changing the injection amount finely in the steady state so that the filtering precision can be improved. As a result, a highly precise learning can be done at the transient time.

The exhaust passage may be provided with a catalyst, and the $O_2$ sensor may be disposed on the downstream side of the catalyst.

In recent years, it has been increased to mount a catalytic & post-treating system such as a NOx catalyst or a Diesel particulate filter. The $O_2$ sensor is subject to the influences of the pressure. In case these post-treating systems are mounted, therefore, the catalyst or the like acts a pressure loss member so that the pressure in the vicinity of the sensor rises to cause a problem that the detection precision of the $O_2$ sensor drops.

According to the present invention, on the contrary, by using the filtering to estimate the exhaust $O_2$ concentration highly precisely every moment thereby to correct the delay, the output value of the $O_2$ sensor can be used highly precisely for the learning correction even if the $O_2$ sensor is arranged on the downstream side of the catalyst.

The updating of the learning correction may be inhibited when an addition of the fuel to an exhaust pipe or a post injection for the catalytic control is done.

For the catalytic control, there has been a technique such as the fuel exhaust pipe addition, in which the fuel is added to the exhaust pipe for a predetermined period, or the post injection in which the fuel is injected into the cylinder after the end of a combustion.

However, these fuel components may lead to a reduction in the detecting precision of the $O_2$ sensor. As the chemical reaction in the catalyst is activated by the fuel addition, moreover, the catalyst temperature rises so that soot is burned in the catalyst. Then, the exhaust $O_2$ concentration in the vicinity of the $O_2$ sensor becomes different from that of the exhaust gas when discharged from the cylinder. This difference makes it difficult to retain the precision of the learning control. With these catalytic controls, therefore, the erroneous learning can be prevented by inhibiting the updating the learning correction.

When the absolute value of the learning correction is no less than a predetermined value, the $O_2$ sensor may be decided to be malfunctioning.

The sensor element has to be held at a temperature as high as 600 to 800° C. for retaining the detection precision of the $O_2$ sensor. Moreover, there may occur a trouble that the sensor element is cracked with water. In these cases, there arises a problem that a mistaken value is learned. When the absolute value of the learning correction is no less than the predetermined value, therefore, the $O_2$ sensor is decided to be malfunctioning. When the malfunction of the $O_2$ sensor is decided, the learning correction by the learning means may be inhibited.

The estimated exhaust $O_2$ concentration is warranted to have a precision of a certain extent although it contains a model error. Even if the learning correction is inhibited because the $O_2$ sensor malfunctions, therefore, the control can be realized with the model estimating value, so that the EGR control or the injection amount control using the exhaust $O_2$ concentration can be prevented from being seriously influenced.

The control system may further comprise means having a target value of the exhaust $O_2$ concentration for each driving region of the internal combustion engine for feedback-controlling the EGR valve so that the estimated value of the exhaust $O_2$ concentration may coincide with the target value. As a result, the exhaust $O_2$ concentration can be made to follow the target value highly responsively thereby to improve the emission.

The command injection amount may be corrected by re-calculating the injection amount so that the estimated value of the exhaust $O_2$ concentration at the calculating time using the command injection amount may coincide with a predetermined target value. As a result, the exhaust $O_2$ concentration can be controlled for every injections so that the controllability of the exhaust $O_2$ concentration can be improved to improve the emission.

The command injection amount may be set with an upper limit so that the estimated value of the exhaust $O_2$ concentration at the calculating time using the command injection amount may not exceed a predetermined limit value on the rich side. As a result, the smoke can be prevented in advance from being produced, while suppressing the correction of the injection amount to the minimum.

The limit value on the rich side may be given as a function of at least a rotation speed of the internal combustion engine. As a result, in case a torque is needed even in a low rotation speed, the correction of the injection amount can be reduced to improve the acceleration.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

FIG. 27A is a flow chart showing a processing procedure of a filtering of the third embodiment;

FIG. 27B is a transmission formula of the third embodiment;

FIG. 28 is a flow chart showing a processing procedure of a learning inhibiting decision of the third embodiment;

DETAILED DESCRIPTION OF PREFERRED EMBODIMENTS

First Embodiment

Figure 1:
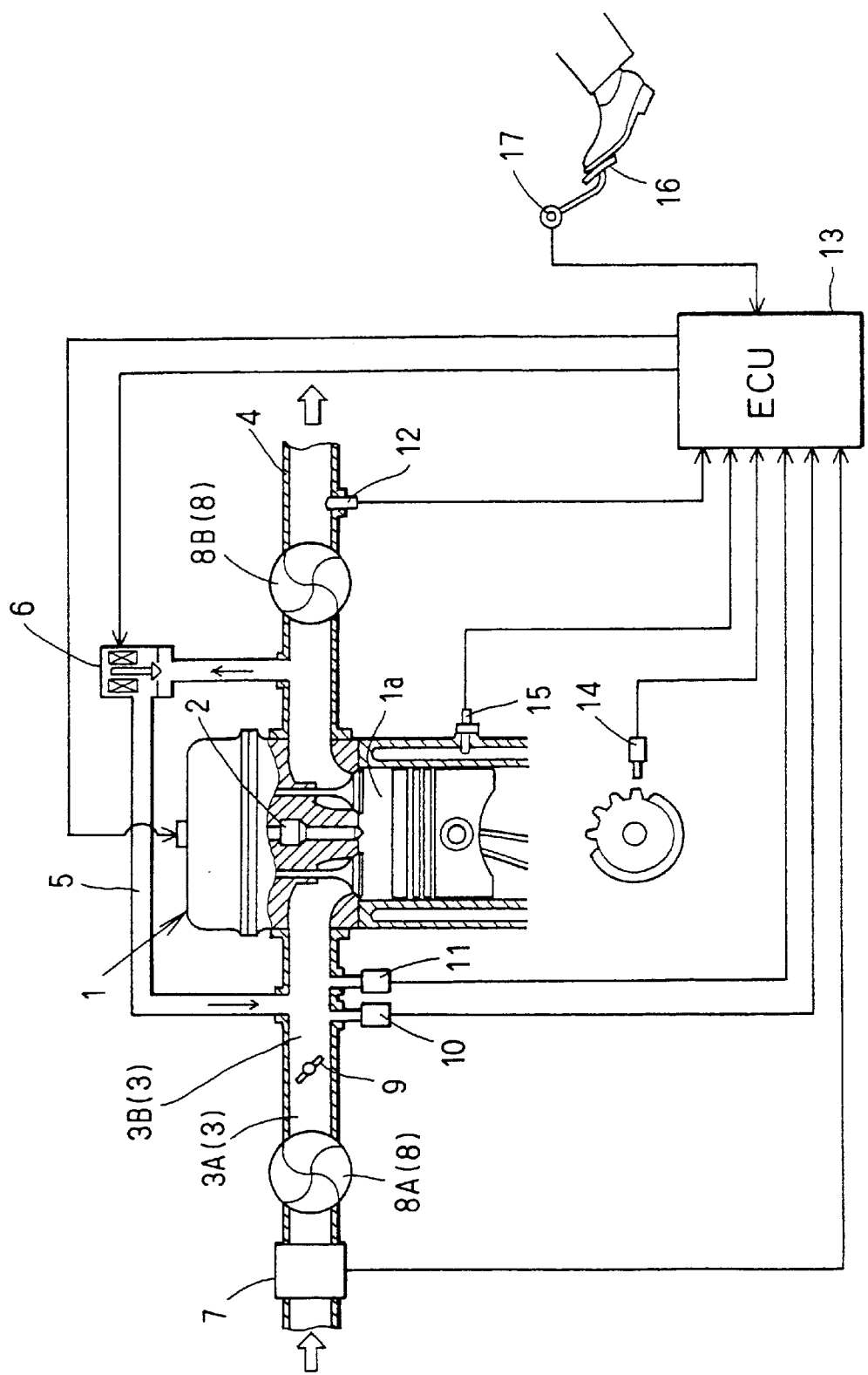
FIG. 1 is a schematically block diagram showing a control system of a Diesel engine according to a first embodiment of the present invention.

With reference to the accompanying drawings, here will be described an embodiment in which the invention is applied to a Diesel engine. FIG. 1 is an entire construction diagram showing a control system of a Diesel engine 1. First of all, the entire construction of the system will be described with reference to FIG. 1.

This system is applied to the Diesel engine (as will be abbreviated into the "engine 1") which is provided with a (later-described) EGR system to recirculate a portion of the exhaust gas to the intake air. This engine 1 adopts a common rail type injection system for injecting a high-pressure fuel accumulated in the not-shown common rail, into a combustion chamber 1a from an injector 2 mounted in the cylinder head of the engine 1. The EGR system is constructed by an EGR passage 5 for providing communication between an intake passage 3 and an exhaust passage 4, and an EGR valve 6 for adjusting an exhaust gas ratio (or EGR amount) to be recirculated via the EGR passage 5.

The intake passage 3 is provided, on the upstream side of its junction with the EGR passage 5, with an airflow meter 7 and a compressor 8A of a variable turbo 8 and, downstream of the compressor 8A, with a Diesel throttle 9 (as will be abbreviated into the "throttle 9"). To the downstream side of the throttle 9, moreover, there are attached an intake pressure sensor 10 for detecting the intake pressure in the intake passage 3, and an intake temperature sensor 11 for detecting the air temperature in the intake passage 3. Here in the present embodiment, the upstream side of the throttle 9 of the intake passage 3 will be called the "intake pipe 3A", and the downstream side of the throttle 9 will be called the "manifold 3B".

The exhaust passage 4 is provided, on the downstream side of the junction with the EGR passage 5, with an exhaust turbine 8B of the variable turbo 8 and, on the downstream side of the exhaust turbine 8B, with an $O_2$ sensor 12 for detecting the $O_2$ concentration of the exhaust gas.

The individual pieces of information of the air system, as detected by the airflow meter 7, the intake pressure sensor 10, the intake temperature sensor 11 and the $O_2$ sensor 12, are output to an electronic control unit (as will be called the "ECU 13") for controlling the actions of the present system.

Moreover, the system has a rotation angle sensor 14 for outputting a signal in synchronism with the rotation angle of the engine 1, a water temperature sensor 15 for detecting the cooling water temperature of the engine 1, and an accelerator opening sensor 17 for detecting the accelerator opening from the depression of an accelerator pedal 16. These various pieces of information detected are output to the ECU 13.

Figure 2:
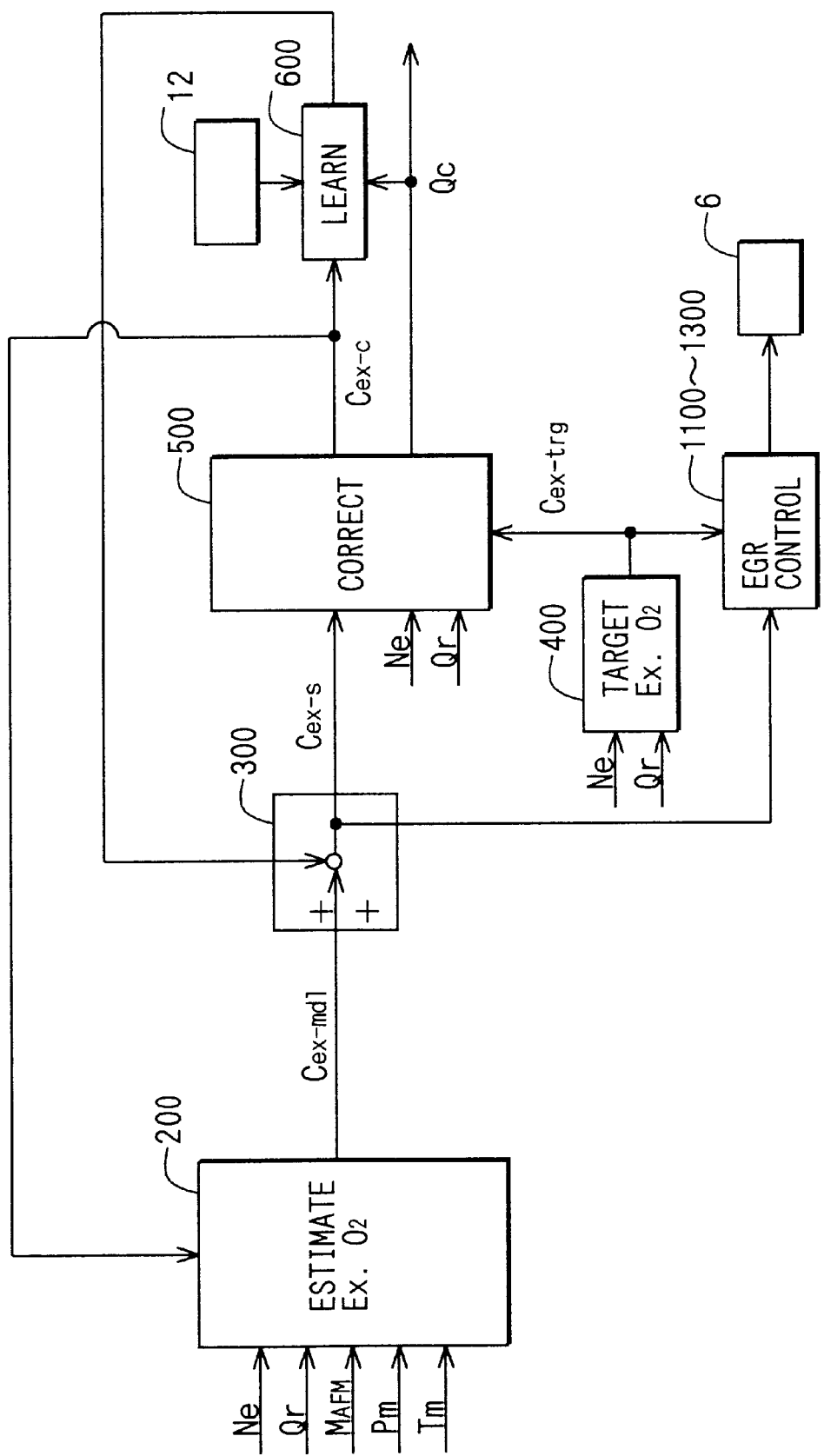
FIG. 2 is a block diagram showing the control system of the first embodiment.

Here will be described a control method of the present system. FIG. 2 is a block diagram showing the control system constructed by the ECU 13. The system has five blocks. An exhaust $O_2$ concentration estimating block 200 estimates an exhaust $O_2$ concentration based on a calculation. A target exhaust $O_2$ concentration calculating block 400 calculates a target exhaust $O_2$ concentration. A correcting block 500 corrects an injection amount by using a predetermined calculation. EGR control blocks 1100 to 1300 calculates an operating degree of the EGR valve 6. A learning correction block 600 learns a difference between the values calculated in the above-described block and provides a correction amount for approaching the actual value to the target value.

Figure 3:
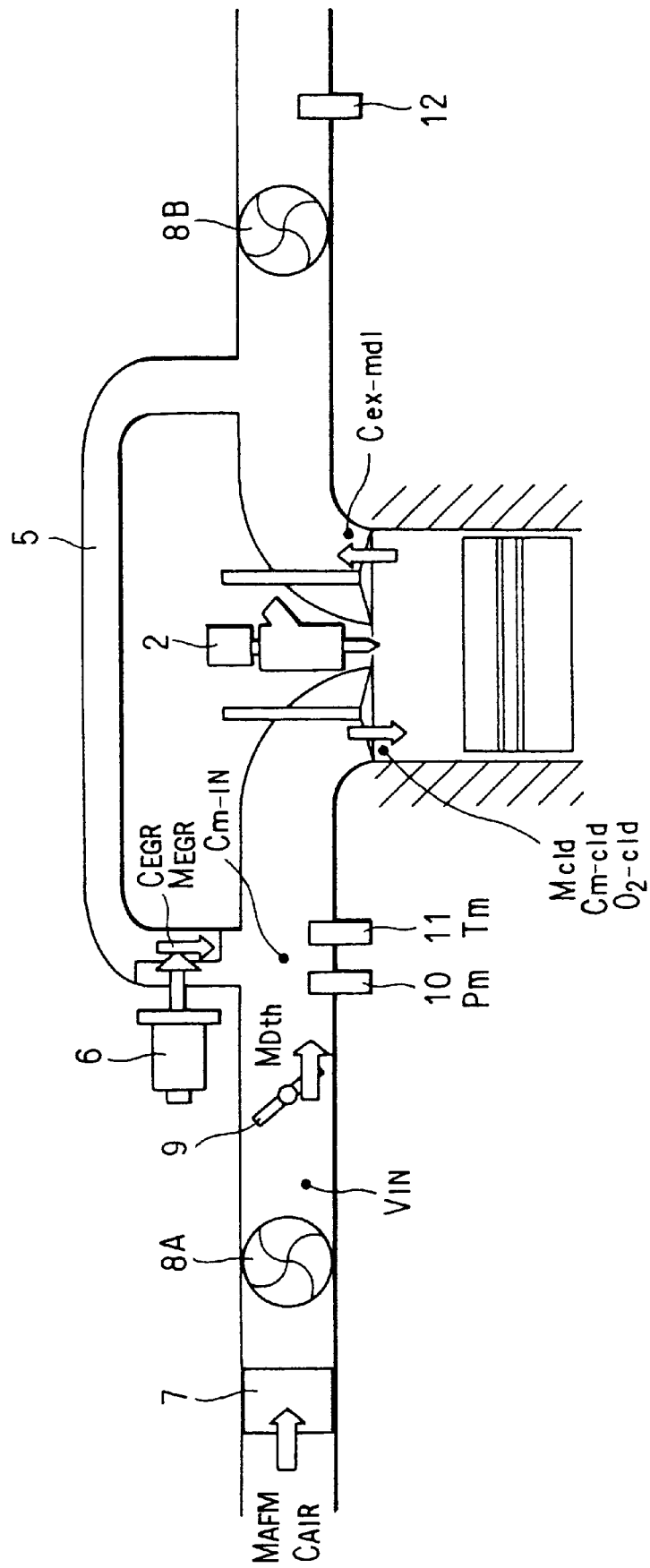
FIG. 3 is a diagram showing an air system with the various symbols to be employed for explaining the control system of the first embodiment.
Figure 4A:
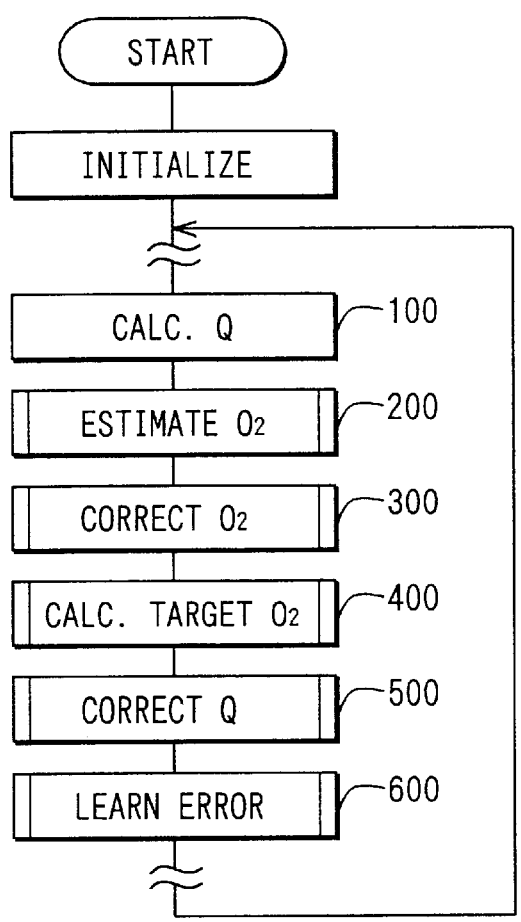
FIGS. 4A and 4B are flow charts showing control procedures of the first embodiment.
Figure 4B:
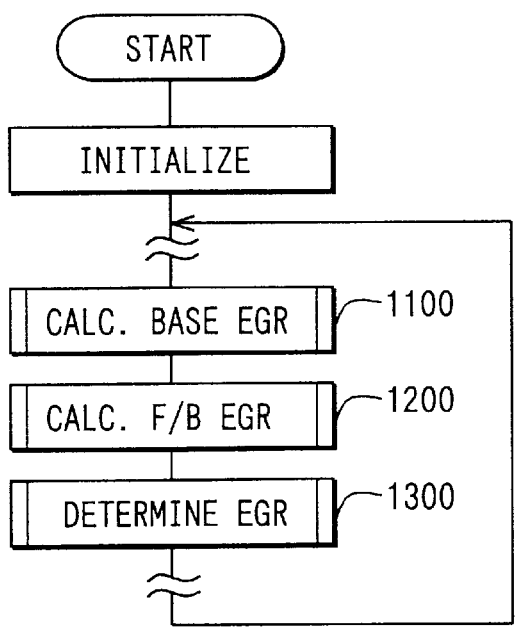

FIG. 3 is a diagram showing an air system with the various symbols to be employed for explaining the control contents of the present system, and FIGS. 4A and 4B are flow charts showing control procedures of the ECU 13.

Here, the main routine shown in FIG. 4A is calculated in synchronism with the injection (or Ne) for every injection cycles. This synchronism with the injection makes it possible to calculate the exhaust $O_2$ concentration of each injection thereby to improve the precision and the emission.

On the other hand, the main routine shown in FIG. 4B is calculated in synchronism with the time, e.g., for every 16 ms (milliseconds). This is because the responsibility of the EGR valve 6 hardly depends on the engine speed Ne. However, no problem arises even if the calculation is made after the routine (or after Step 600) shown in FIG. 4A.

At first, the contents of the main routine shown in FIG. 4A will be described. At Step 100 (i.e., command injection calculating means), a command injection Qr is calculated. Although the flow chart showing the calculating procedure is omitted, the command injection Qr is determined by summing a fundamental injection, as calculated from the map of the engine speed Ne and the accelerator opening, and an injection for generating a driving force necessary for the air conditioner or the like.

At Step 200 (i.e., exhaust $O_2$ concentration estimating means), the exhaust $O_2$ concentration of each combustion in the cylinder is estimated.

At Step 300, the precision is improved by adding a learning correction calculated at the later-described Step 611 to the estimated value of Step 200.

At Step 400, the target exhaust $O_2$ concentration is calculated.

At Step 500, the injection is corrected by using the estimated exhaust $O_2$ concentration calculated at Step 300 after learning and the target exhaust $O_2$ concentration calculated at Step 400.

At Step 600, the error learning of the estimated exhaust $O_2$ concentration after the injection was corrected is done with the actually measured exhaust $O_2$ concentration. At this time, the precision in the steady state is improved by doing an integral learning in the steady state.

Figure 5:
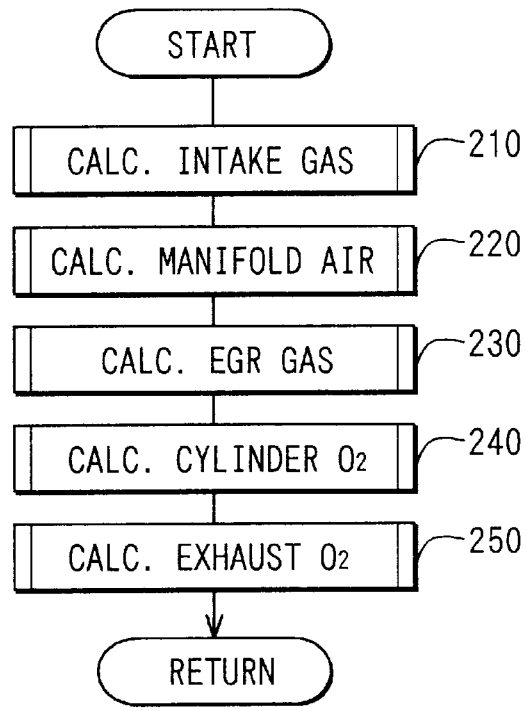
FIG. 5 is a flow chart showing a procedure for determining an exhaust $O_2$ concentration of the first embodiment.

Subsequently, the contents of the individual Steps to be done in the main routine of FIG. 4A will be described in detail. FIG. 5 is a subroutine showing the processing procedure of Step 200, and the detailed processing procedures of the individual Steps shown in FIG. 5 are shown in the individual flow charts of FIGS. 6 to 10.

Figure 6:
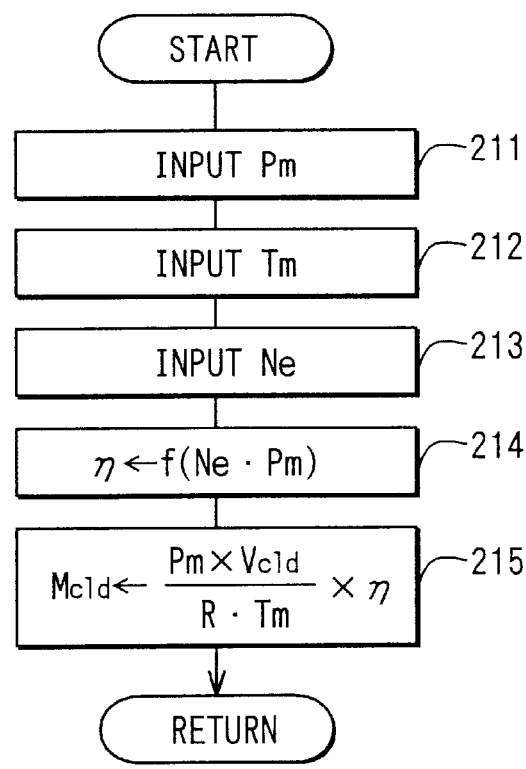
FIG. 6 is a flow chart showing a procedure for calculating a gas flow into a cylinder of the first embodiment.

At Step 210, an amount of air Mcld into the cylinder is calculated. Referring to FIG. 6, at Steps 211 to 213, there are sequentially read an intake pressure Pm detected by the intake pressure sensor 10, an intake temperature Tm detected by the intake temperature sensor 11, and the engine rotation speed Ne. At Step 214, a volume efficiency η is calculated as a function of Ne and Pm. At Step 215, the amount of air Mcld into the cylinder is calculated from the gas state equation and η. Here, the letter R used in the gas state equation designates a gas constant which may have a constant value. At Step 220, an amount of fresh air MDth into the manifold 3B is calculated.

Figure 7:
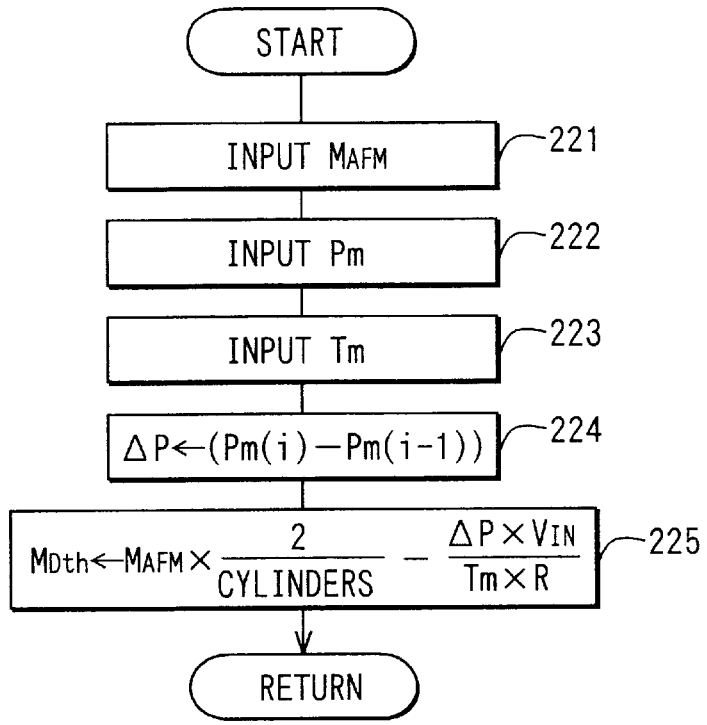
FIG. 7 is a flow chart showing a procedure for calculating a fresh airflow into a manifold of the first embodiment.

Referring to FIG. 7, at Steps 221 to 223, there are sequentially read an amount of intake air MAFM measured by the airflow meter 7, the intake pressure Pm, and the intake temperature Tm. At Step 224, a change ΔP in the intake pressure is calculated. At Step 225, an amount of fresh air MDth is calculated. Here, Pm is substituted for the pressure in the intake pipe 3A from the airflow meter 7 to the throttle 9, and the mass increase in the intake pipe 3A is calculated by the gas state equation so that the amount of fresh air MDth can be calculated from the law of conservation of mass in the intake pipe 3A, as expressed by the following Formula <1>:

$$MAFM \times (2/\text{Number of cylinders}) - MDth = \Delta P \cdot VIN/(TM \cdot R) \qquad <1>.$$

At Step 230, an amount of EGR gas MEGR into the manifold 3B is calculated.

Figure 8:
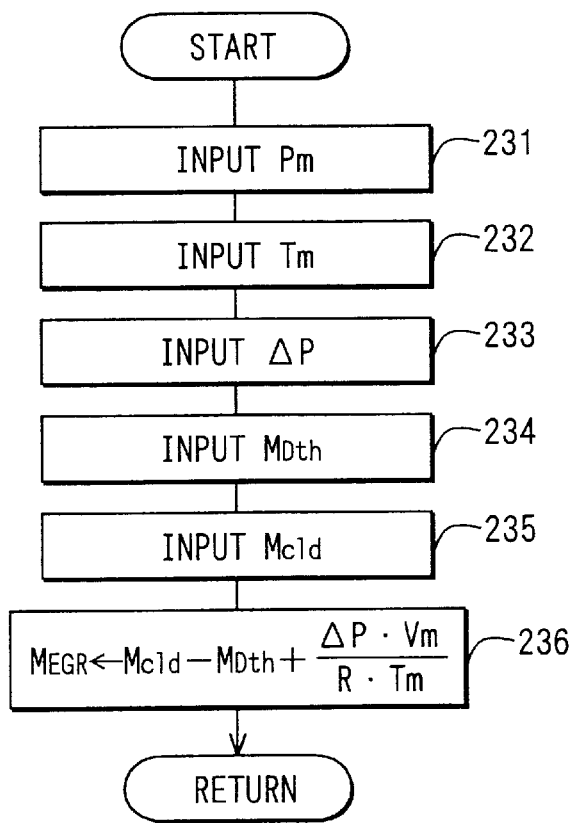
FIG. 8 is a flow chart showing a procedure for calculating an EGR gas flow into the manifold of the first embodiment.

As shown in FIG. 8, more specifically, at Steps 231 to 235, Pm, Tm, ΔP, MDth and Mcld are sequentially read, and at Step 236, the amount of EGR gas MEGR is calculated. In other words, the mass increase in the manifold 3B is calculated from the gas state equation, and the amount of EGR gas MEGR is calculated from the law of conservation of mass in the manifold 3B, as expressed by the following Formula <2>:

$$MDth + MEGR - Mcld = \Delta P \cdot Vm/(Tm \cdot R) \qquad <2>.$$

Figure 9:
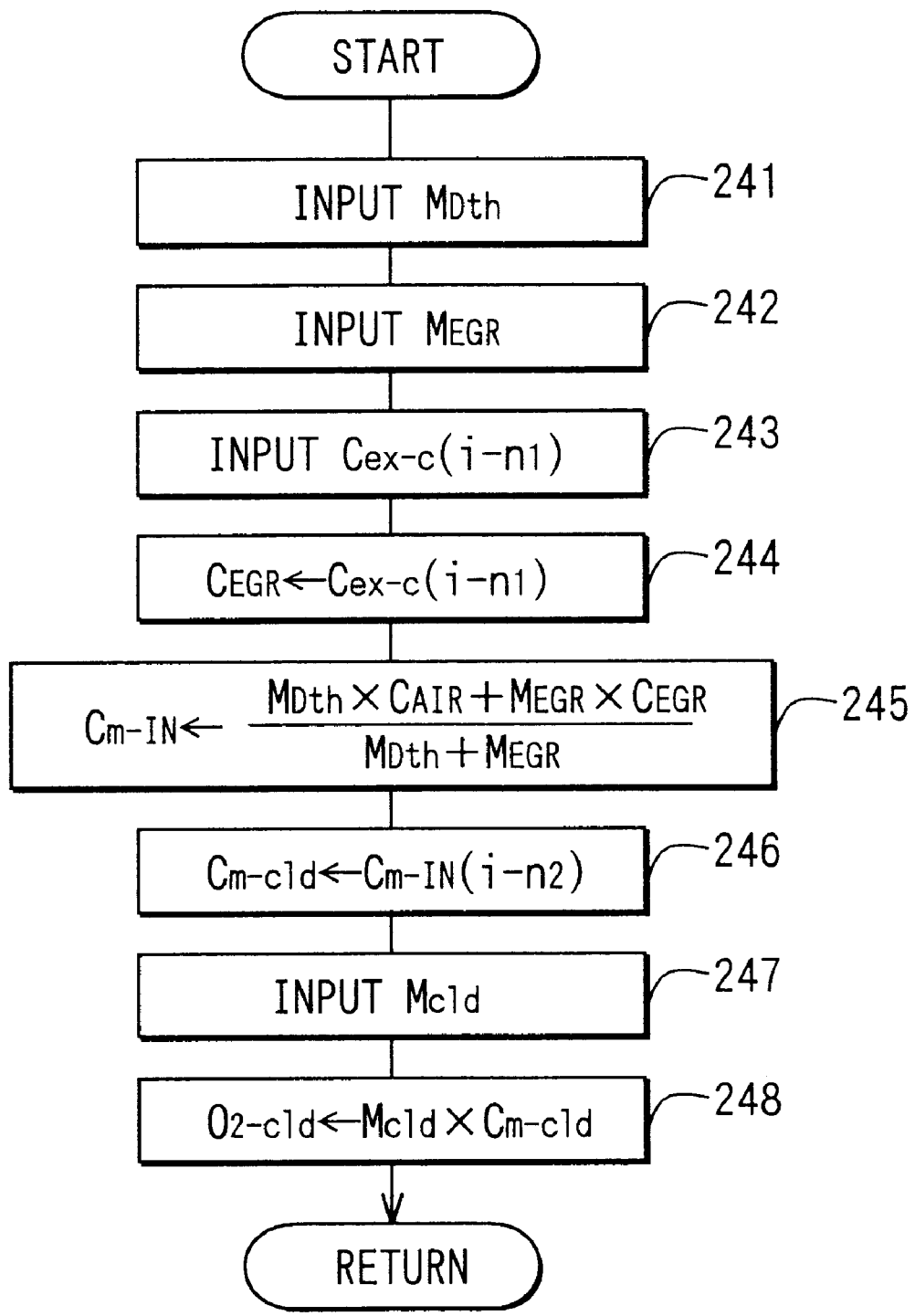
FIG. 9 is a flow chart showing a procedure for calculating an $O_2$ flow into the cylinder of the first embodiment.

At Step 240, the $O_2$ amount $O_2$-cld in the gas to flow into the cylinder is calculated. As shown in FIG. 9, more specifically, at Steps 241 to 243, there are sequentially read MDth, MEGR, the corrected exhaust $O_2$ concentration Cex-c($i-n_1$) and so on (i.e., the corrected exhaust $O_2$ concentrations before $n_1$ cycle) calculated in the past cycles, and at Step 244, Cex-c($i-n_1$) is stored as the $O_2$ concentration CEGR in the EGR gas in the memory. Here, the letter $n_1$ considers the flow delay of the gas and may be a constant or a function of Ne. For simplicity, the Cex-c may be rounded. In order to improve the precision, moreover, the $n_1$ may be a function of the past amount of EGR gas MEGR. In a specific method, the volume of the EGR passage 5 (or the EGR pipe) is multiplied by the gas density and is divided by the amount of EGR gas (at the past value) per cycle.

Subsequently, at Step 245, the $O_2$ concentration Cm-IN in a place where the fresh gas and the EGR gas are mixed, and at Step 246, the $O_2$ concentration Cm-cld in the gas to flow into the cylinder is calculated. Here, letter $n_2$ considers the flow delay of the gas and may be a constant or a function of Ne. Moreover, the Cm-IN may be rounded.

Subsequently, at Step 247, an amount of intake air into the cylinder Mcld is read. At Step 248, an amount of $O_2$ into the cylinder $O_2$-cld is calculated by obtaining the product of Mcld and Cm-cld.

Figure 10:
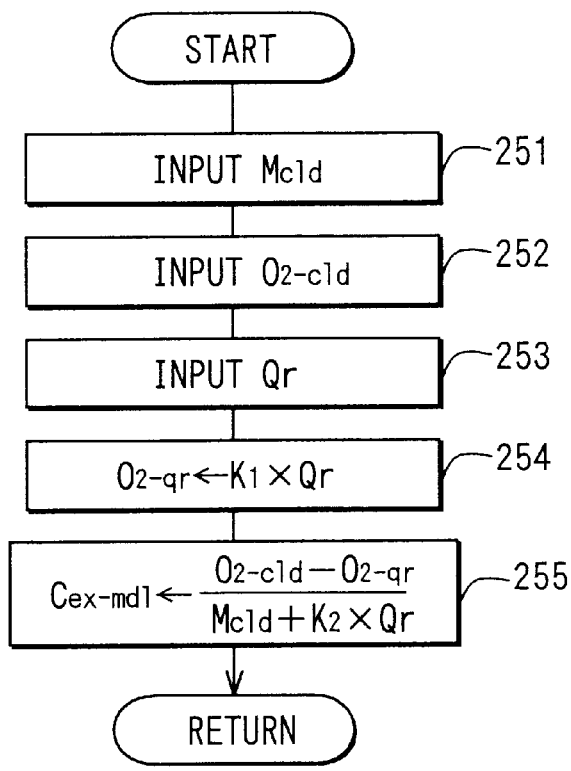
FIG. 10 is a flow chart showing a procedure for calculating an exhaust $O_2$ concentration of the first embodiment.

At Step 250, a model estimated exhaust $O_2$ concentration Cex-mdl is calculated. As shown in FIG. 10, at Steps 251 to 253, there are sequentially read the Mcld, the $O_2$-cld and the command injection Qr. At Step 254 (i.e., consumed $O_2$ amount calculating means), the $O_2$ amount to be consumed by the command injection Qr is calculated. A letter K1 (or constant) designates the consumed $O_2$ mass per unit fuel. In case the ratio of an incomplete combustion is high (e.g., 1% or more) depending upon the combustion mode, however, a correction may be made.

At Step 255, moreover, the model estimated exhaust $O_2$ concentration Cex-mdl is calculated. Specifically, the residual oxygen amount is calculated by subtracting a consumed oxygen amount $O_2$-qr from the $O_2$-cld. The Cex-mdl can be calculated by dividing the residual oxygen amount by the sum of the amount of intake air Mcld of the cylinder and the fuel amount K2×Qr. Here, K2 is a constant indicating the fuel density.

Figure 11:
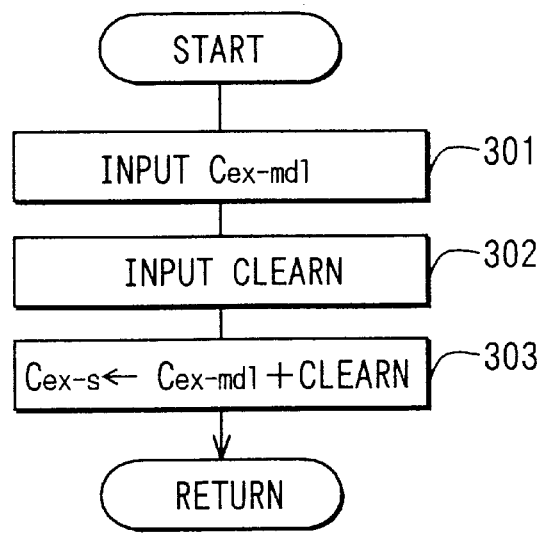
FIG. 11 is a flow chart showing a procedure for determining an estimated exhaust $O_2$ concentration after learning of the first embodiment.

FIG. 11 is a subroutine showing a processing procedure of Step 300. At Step 301, the model estimated exhaust $O_2$ concentration Cex-mdl calculated at the foregoing Step 255 is read. At Step 302, a learning correction CLEARN calculated at the later Step 611 is read. At Step 303, an estimated exhaust $O_2$ concentration Cex-s after learning is calculated by adding the CLEARN to the Cex-mdl.

Figure 12A:
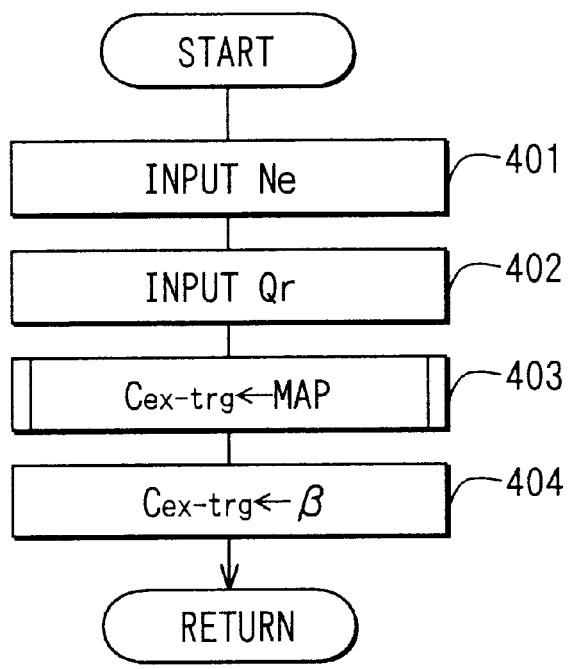
FIG. 12A is a flow chart showing a procedure for determining a target exhaust $O_2$ concentration.
Figure 12B:
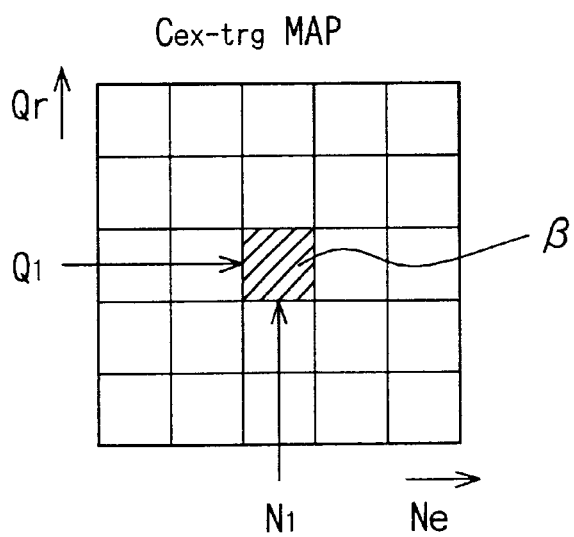
FIG. 12B is a map of the first embodiment.

FIG. 12A is a subroutine showing a processing procedure of Step 400. Here, at Steps 401 to 402, the Ne and the Qr are read, and at Step 403, a target exhaust $O_2$ concentration Cex-trg is calculated from the map shown in FIG. 12B.

For Ne=N1 and Qr=Q1 in the figure, for example, a value $\beta$ is calculated by the map retrieval. Here, the target exhaust $O_2$ concentration, as buried in the map, has a value which has been so experimentally determined in advance that the $O_2$ concentration discharged from the engine 1 may establish satisfactory emission, fuel economy and drivability at all times for every drive ranges. Subsequently, at Step 404, the value $\beta$ determined at Step 403 is stored as the target exhaust $O_2$ concentration Cex-trg in the memory.

Figure 13:
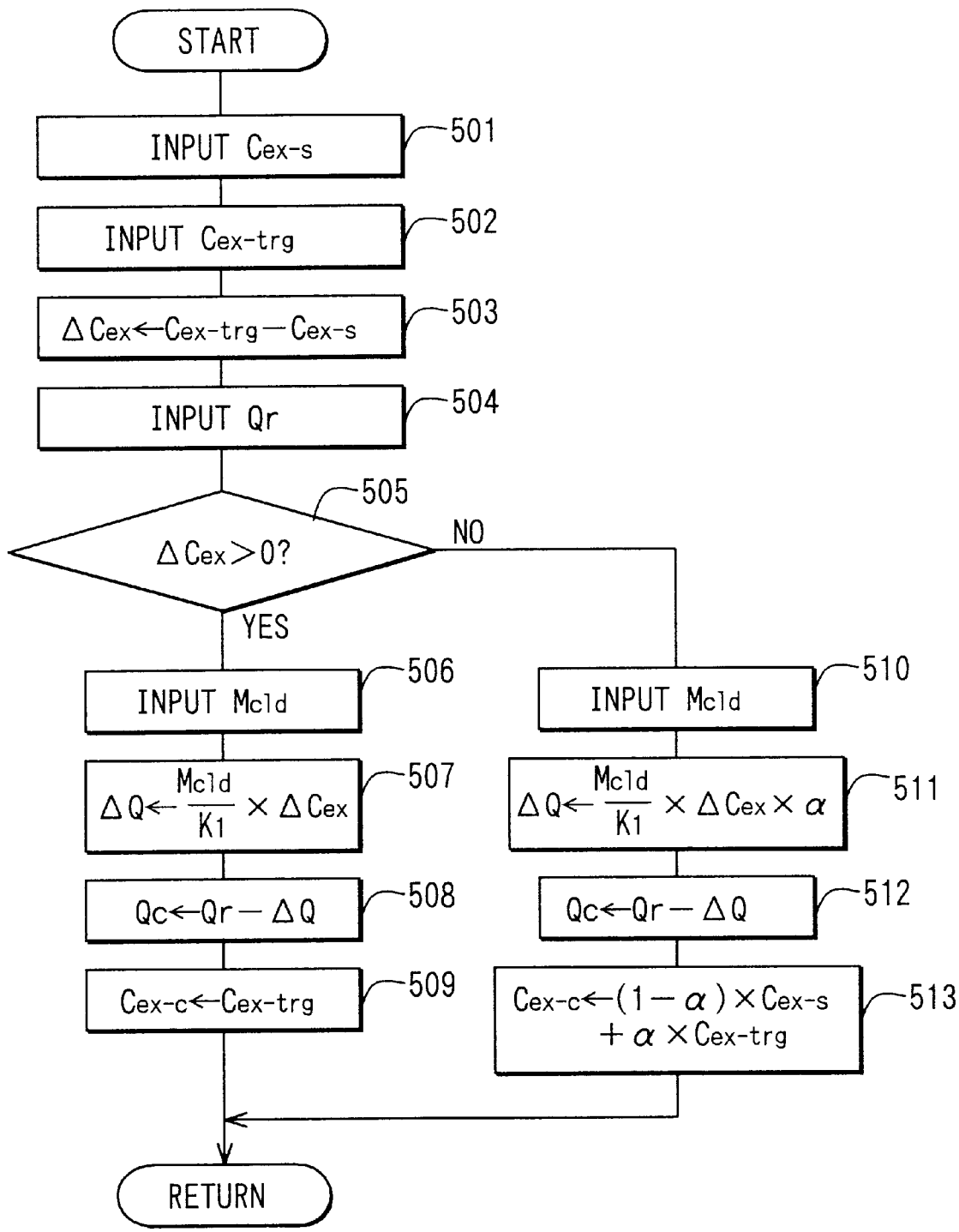
FIG. 13 is a flow chart showing a procedure for correcting an injection amount of the first embodiment.

FIG. 13 is a subroutine showing a processing procedure of Step 500. Here, at Steps 501 and 502, the estimated exhaust $O_2$ concentration Cex-s after learning and the target exhaust $O_2$ concentration Cex-trg are read, and at Step 503, a deviation $\Delta$Cex of the two is calculated.

Subsequently, at Step 504, the command injection is input, and at Step 505, it is decided whether the $\Delta$Cex is larger than 0. For $\Delta$Cex>0, i.e., if Cex-s is larger Cex-trg, the injection is corrected at Steps 506 to 508.

Specifically, at Step 506, the amount of intake air Mcld into the cylinder is input. At Step 507, an injection correction $\Delta$Q is calculated to coincide with the target exhaust $O_2$ concentration Cex-trg. Here, the Formula 507 can be derived by eliminating the consumed oxygen amount $O_2$-qr from the Formulas of Step 254 and Step 255, and by differentiating the two sides with the Qr assuming Mcld>>K2×Qr.

Subsequently at Step 508, a corrected injection amount Qc after corrected is calculated from the command injection amount Qr and the injection correction $\Delta$Q. Moreover, the injection amount is changed to coincide with the target exhaust $O_2$ concentration Cex-trg. At Step 509, therefore, the target exhaust $O_2$ concentration Cex-trg is stored as an exhaust $O_2$ concentration Cex-c after the injection correction in the memory.

In case $\Delta$Cex$\leq$0 at Step 505, on the other hand, the injection amount is corrected at Steps 510 to 512. Like Steps 506 to 508, the injection amount is corrected to the increasing side so that the correction is lightened with a coefficient $\alpha$ (=0 to 1). This is because the torque is prevented from becoming more than that demanded by the driver. Here, the coefficient $\alpha$ is adjusted beforehand from the relation between the emission and the drivability. The coefficient $\alpha$ becomes small, if the drivability is dominated, but becomes large if the emission is dominated.

The operations of Steps 510 to 512 will be specifically described. At Step 510, the amount of intake air Mcld is input. At Step 511, the injection correction $\Delta$Q is then calculated. At Step 512, the corrected injection amount Qc is calculated from the command injection amount Qr and the injection correction $\Delta$Q. At Step 513, moreover, the exhaust $O_2$ concentration Cex-c after the injection correction is stored in the memory. At Step 513, the estimated exhaust $O_2$ concentration Cex-s after learning and the target exhaust $O_2$ concentration Cex-trg are internally divided with the coefficient $\alpha$.

Figure 14:
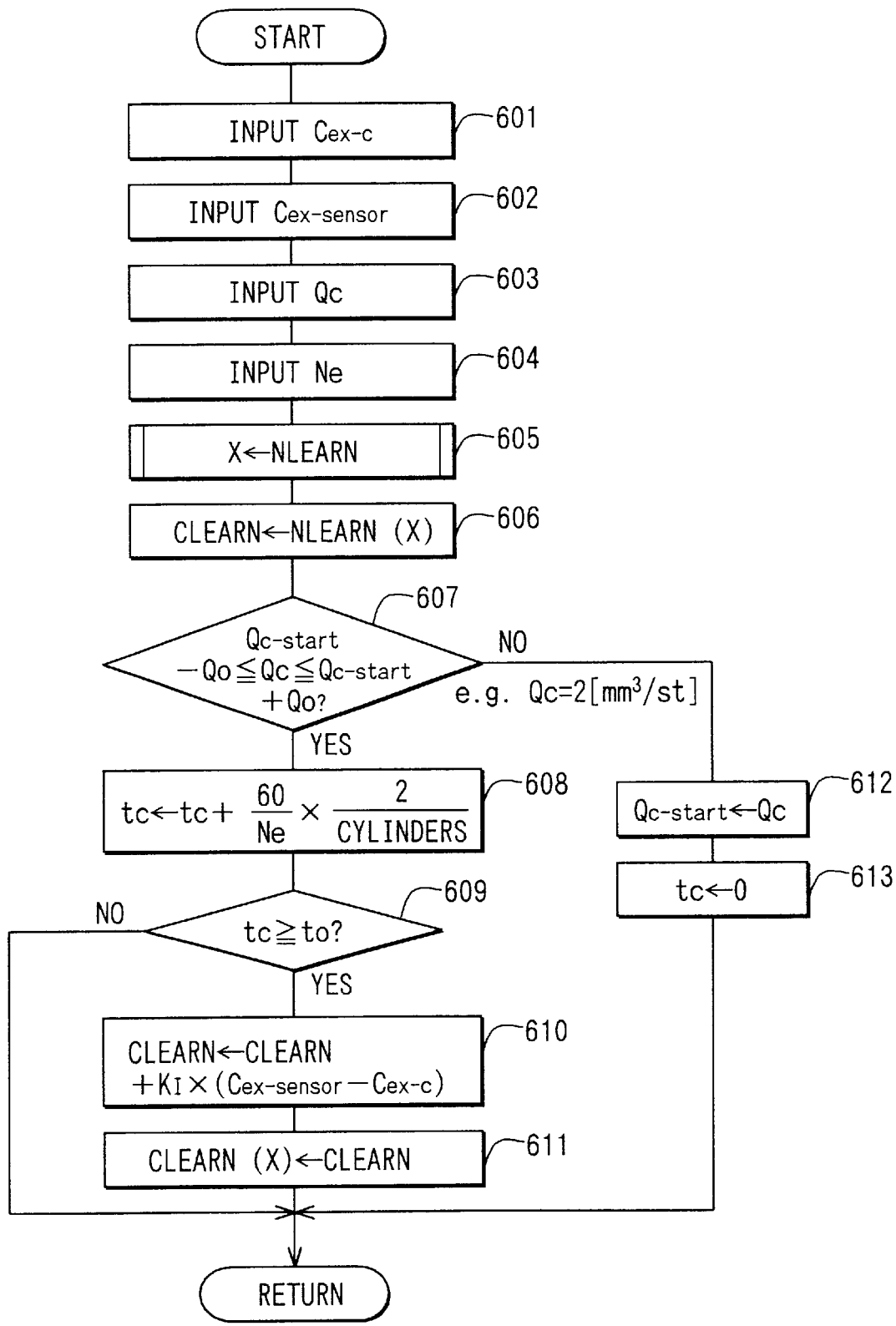
FIG. 14 is a flow chart showing a procedure for learning and calculating a model error of the first embodiment.

FIG. 14 is a subroutine showing a processing procedure of Step 600.

Figures 15, 16:
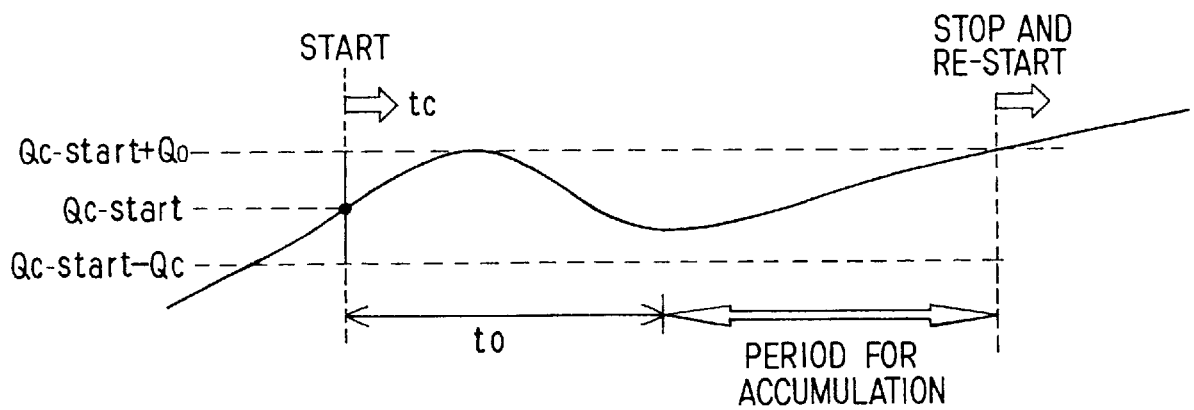
FIG. 15 is a map showing a learning region of the first embodiment.
FIG. 16 is a diagram for explaining a steady state of the first embodiment.

Here, at Steps 601 to 604, there are sequentially read the exhaust $O_2$ concentration Cex-c calculated at Step 500 after the injection correction, the output value Cex-sensor of the $O_2$ sensor 12, the Qc and the Ne. At Step 605, the learning region is decided. One example of this learning region is shown in FIG. 15.

Subsequently, at Step 606, the learning value (or the learning correction) is read from the learning region, and at Steps 607 to 609, it is decided whether or not the state is steady. However, this decision is one example for deciding the steady state.

The operations of Steps 607 to 609 will be described with reference to FIG. 16. Here, values Q0, Qc and t0 in FIG. 16 are conforming values, as may be exemplified by Q0=3 mm$^3$/st, Qc=3 mm$^3$/st and t0=3 [s]. Moreover, (60/Ne)×(2/Number of cylinders) of Step 608 indicate a time interval for every injection cycles, and K1 at Step 610 indicate an integral constant (e.g., 0.05).

At Step 607, it is decided from an injection amount Qc-start at the start whether or not the injection amount is within a predetermined range (Qc-start−Q0 to Qc-start+Qc).

At Step 608, a counter tc is incremented by the time interval for every injection cycles.

At Step 609, the steady state is decided if tc exceeds the predetermined time t0.

If the answer of Step 607 is NO, the injection amount Qc is replaced at Step 612 by the injection amount Qc-start at the start, and the routine returns to the START by resetting the counter tc (to 0) at Step 613.

Here will be described the contents of the main routine shown in FIG. 4B.

At Step 1100, there is calculated the base EGRV control (or the base control current of the EGR valve) corresponding to the prevailing drive state of the engine 1.

At Step 1200, there is calculated the correction of exhaust $O_2$ F/B correction (as will be abbreviated into the "F/B correction") to the base EGRV control.

At Step 1300, the EGRV control is determined by adding the F/B correction to the base EGRV control.

Figure 17A:
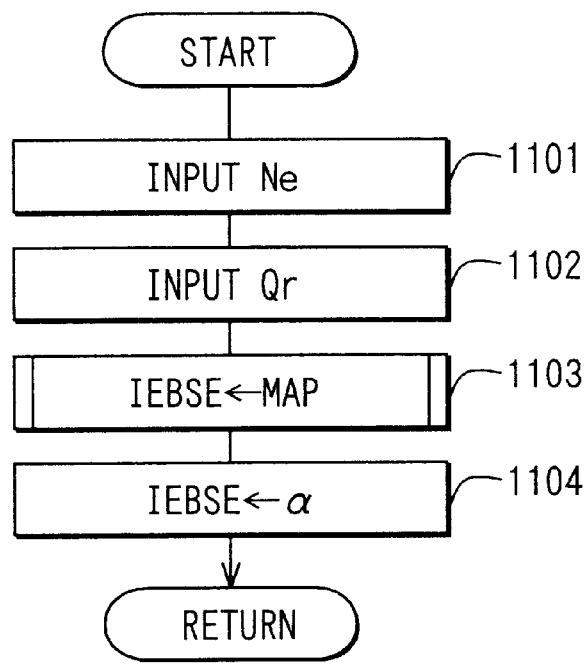
FIG. 17A is a flow chart showing a procedure for calculating a basic EGRV control.

Subsequently, here will be detailed the contents of the individual Steps to be done in the main routine of FIG. 4B.

a) FIG. 17 is a subroutine showing the processing procedure of Step 1100.

Figure 17B:
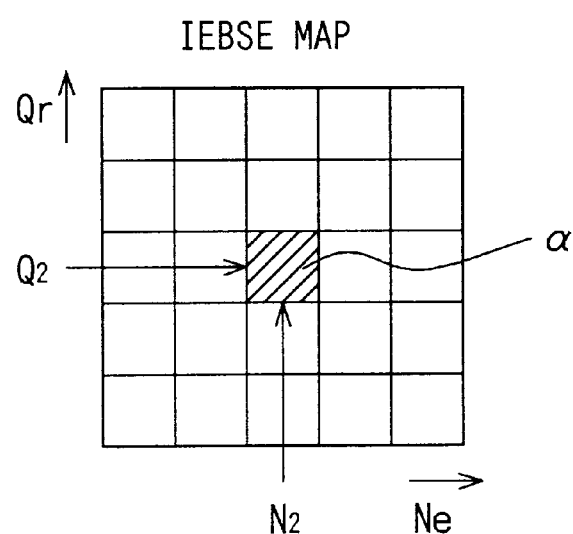
FIG. 17B is a map of the first embodiment.

At Steps 1101 and 1102, the values Ne and Qr are read, and at Step 1103, the base EGRV control is then calculated from the map shown in FIG. 17B. For Ne=N2 and Qr=Q2 in the figure, for example, the value α is calculated from the map retrieval. Here, the base EGRV control buried in the map is determined by setting the EGR ratio experimentally in advance so that the emission, the fuel economy and the drivability may take ideal values for every drive ranges of the engine at the initial center product of the control system.

Figure 18:
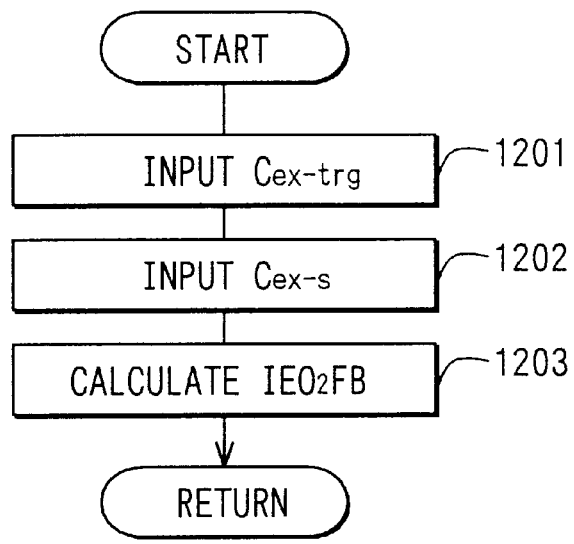
FIG. 18 is a flow chart showing a procedure for calculating an exhaust $O_2$ F/B correction of the first embodiment of the first embodiment.

After this, at Step 1104, the value α determined at Step 1103 is stored as a base EGRV control IEBSE in the memory.

b) FIG. 18 is a subroutine showing a processing procedure of Step 1200.

Figure 19:
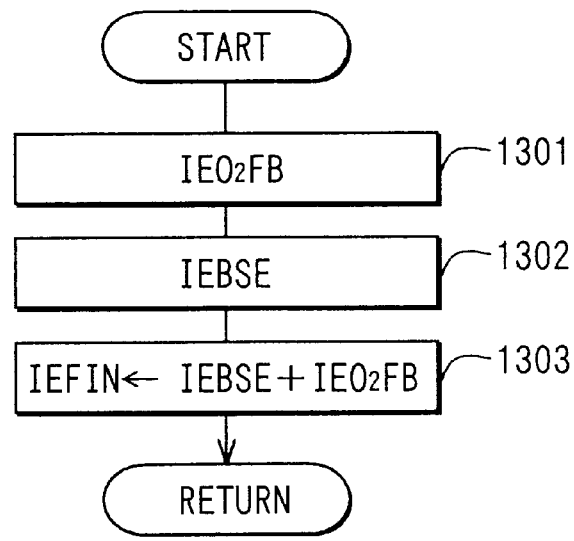
FIG. 19 is a flow chart showing a procedure for calculating a final EGRV control of the first embodiment.

Here, at Steps 1201 and 1202, the target exhaust $O_2$ concentration Cex-trg and the estimated exhaust $O_2$ concentration Cex-s after learning are read, and at Step 1203, the F/B amount IEO2FB is calculated. For this calculation, there can be conceived the general proportional integration control (i.e., the PI control) and the state F/B control.

c) FIG. 19 is a subroutine showing a processing procedure of step 1300. Here, at Steps 1301 and 1302, the F/B amount IEO2FB and the fundamental EGRV control IEBSE are read, and at Step 1303, the two are then added to determine the final EGRV control IEFIN.

In the present system thus far described, the exhaust $O_2$ concentration for every combustions in the cylinder is calculated on the basis of the amount of intake air MAFM, the intake pressure Pm and the command injection amount Qr. As compared with the case in which the exhaust $O_2$ concentration is detected by the $O_2$ sensor 12 attached to the exhaust passage 4, according to this method, there is neither the time delay for the exhaust gas to create till it reaches the sensor 12 nor the chemical reaction delay of the $O_2$ sensor 12 itself, so that the exhaust $O_2$ concentration can be precisely estimated.

By making the EGR control or the injection amount control according to the estimated exhaust $O_2$ concentration, therefore, the responsibility and the control precision especially at a transient time are improved drastically better than those of the case in which the injection amount control or the EGR control is made on the basis of the exhaust $O_2$ concentration detected by the $O_2$ sensor 12.

Second Embodiment

Figure 20:
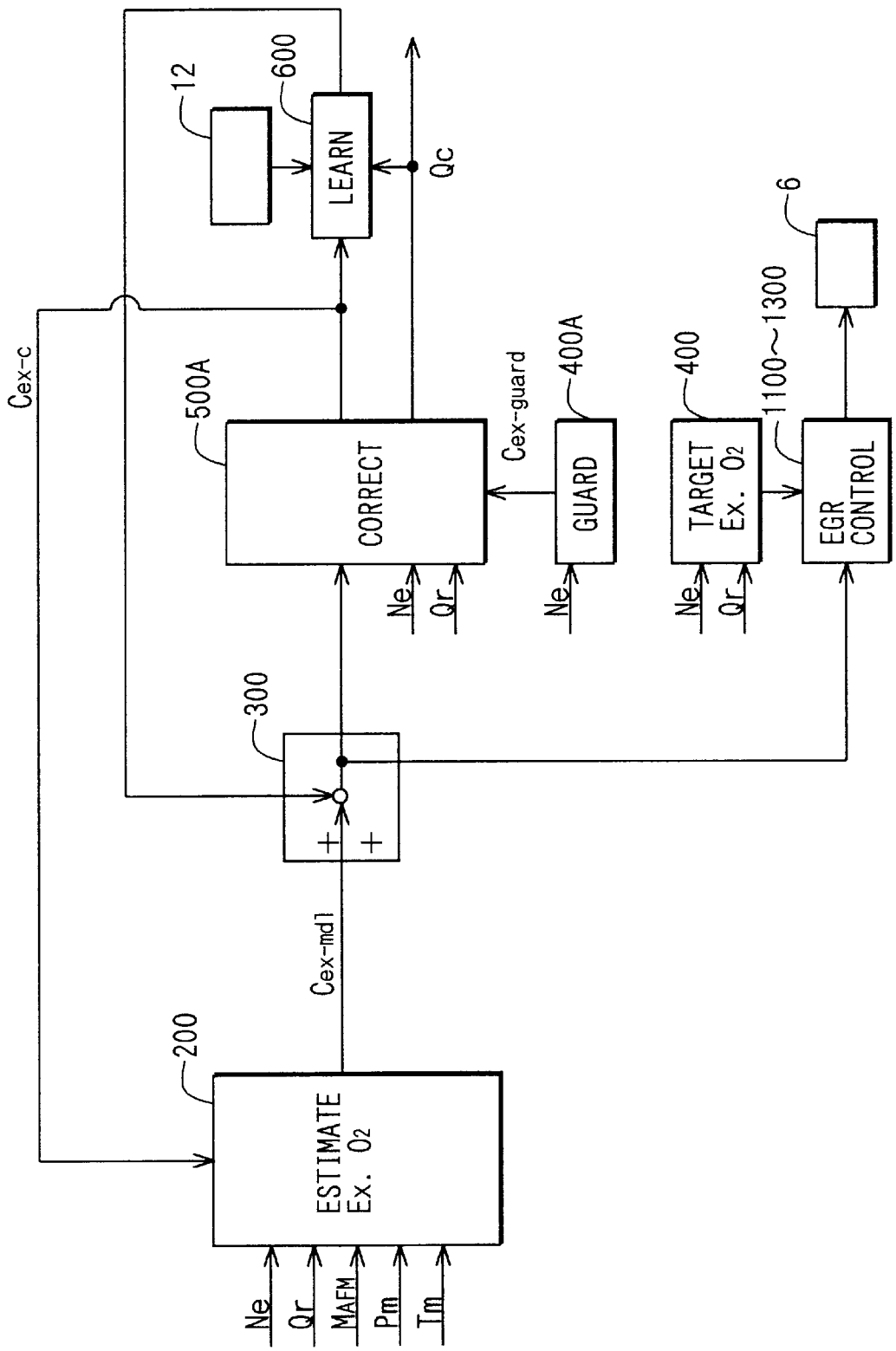
FIG. 20 is a block diagram showing a control system according to a second embodiment of the present invention.

FIG. 20 is a block diagram showing the control contents by the ECU 13. This embodiment is different from the first embodiment (of FIG. 2) in that not the target exhaust $O_2$ concentration but a limit exhaust $O_2$ concentration is used at the input of the injection correcting block. If the exhaust $O_2$ concentration lowers at an acceleration or the like, the smoke increases so that the limit exhaust $O_2$ concentration indicates the limit value. The smoke can be reduced if the injection amount is so controlled that the exhaust $O_2$ concentration may not go to the richer side (that is, it may not go to the lower side) than the limit value.

Figure 21A:
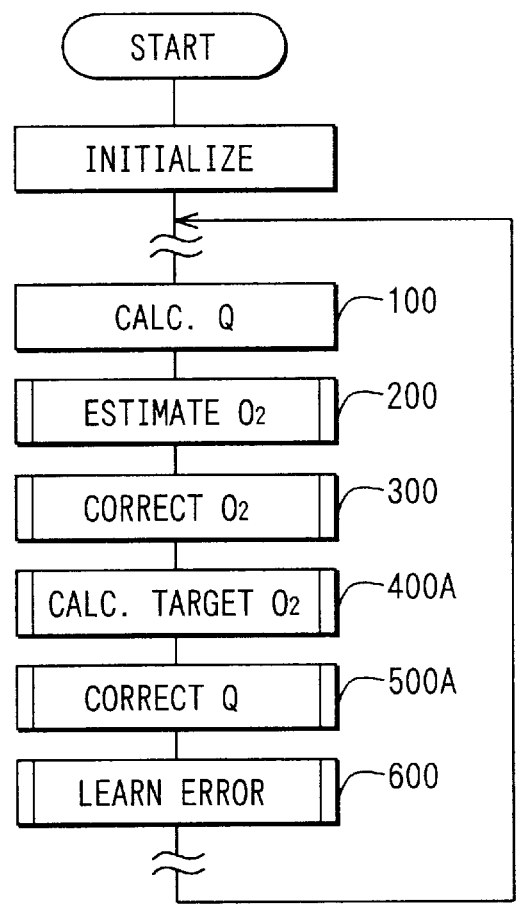
FIGS. 21A and 21B are flow charts showing a control procedure of the second embodiment.
Figure 21B:
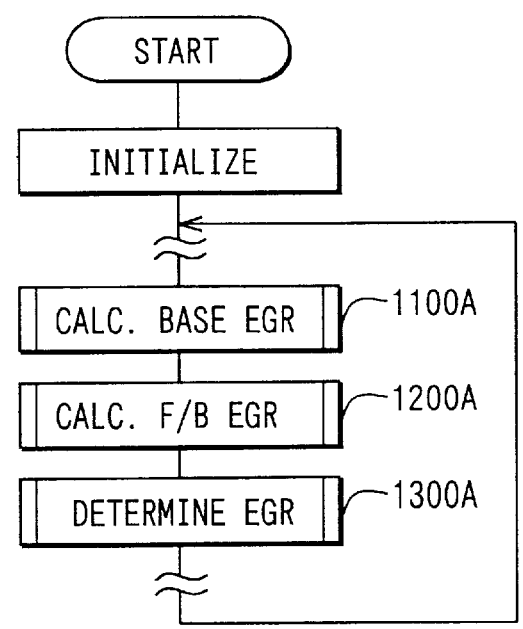

FIGS. 21A and 21B are flow charts showing the control procedures of the ECU 13, and these flow charts are different at Step 400A and Step 500A from those of the first embodiment (FIGS. 4A and 4B).

Figure 22:
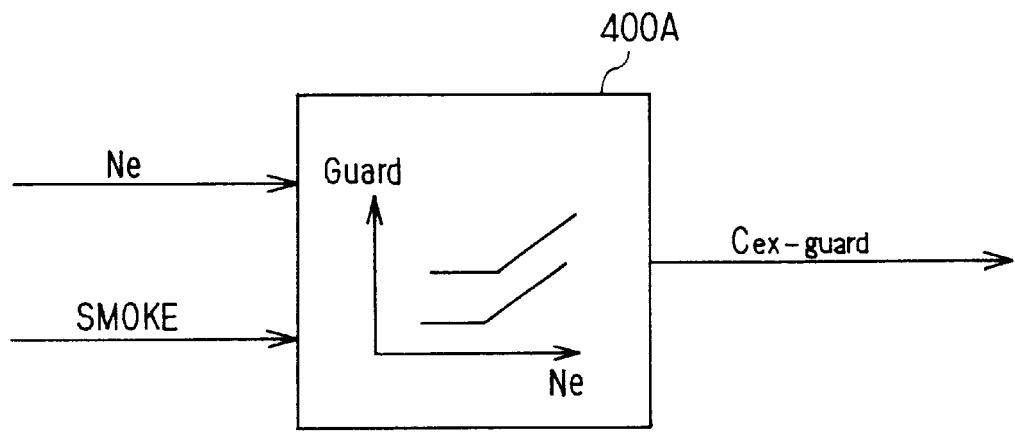
FIG. 22 is a diagram showing a block for determining a limit exhaust $O_2$ concentration of the second embodiment.

At Step 400A, the limit exhaust $O_2$ concentration is determined from the map plotted by using the engine rotation speed Ne and the allowable smoke as parameters, as illustrated in FIG. 22. Specifically, the smoke is expressed as a function of the rotation speed. If the limit exhaust $O_2$ concentration is provided as a function of the rotation speed, therefore, the precision is so highly improved that the injection amount can be increased up to the desired smoke concentration limit.

Figure 23:
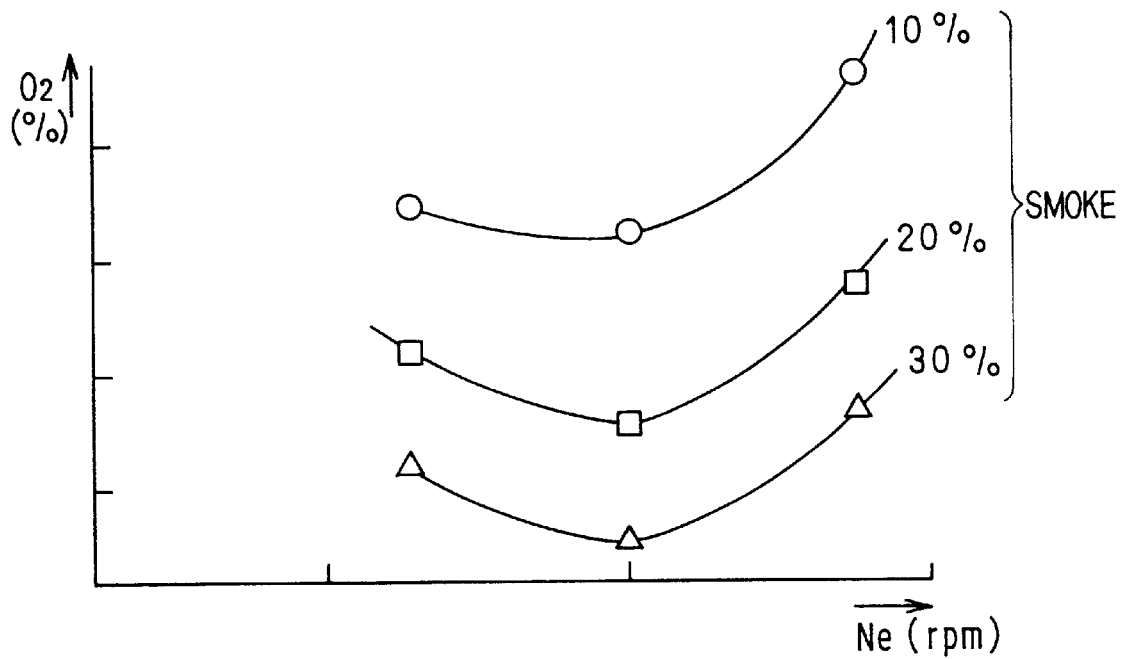
FIG. 23 is a map showing a relationship between an exhaust $O_2$ concentrations the rotation speed of the engine and a smoke amount.

FIG. 23 shows one example of the map. This map is different for the engine shape, although not so much, so that it can be easily applied.

Figure 24:
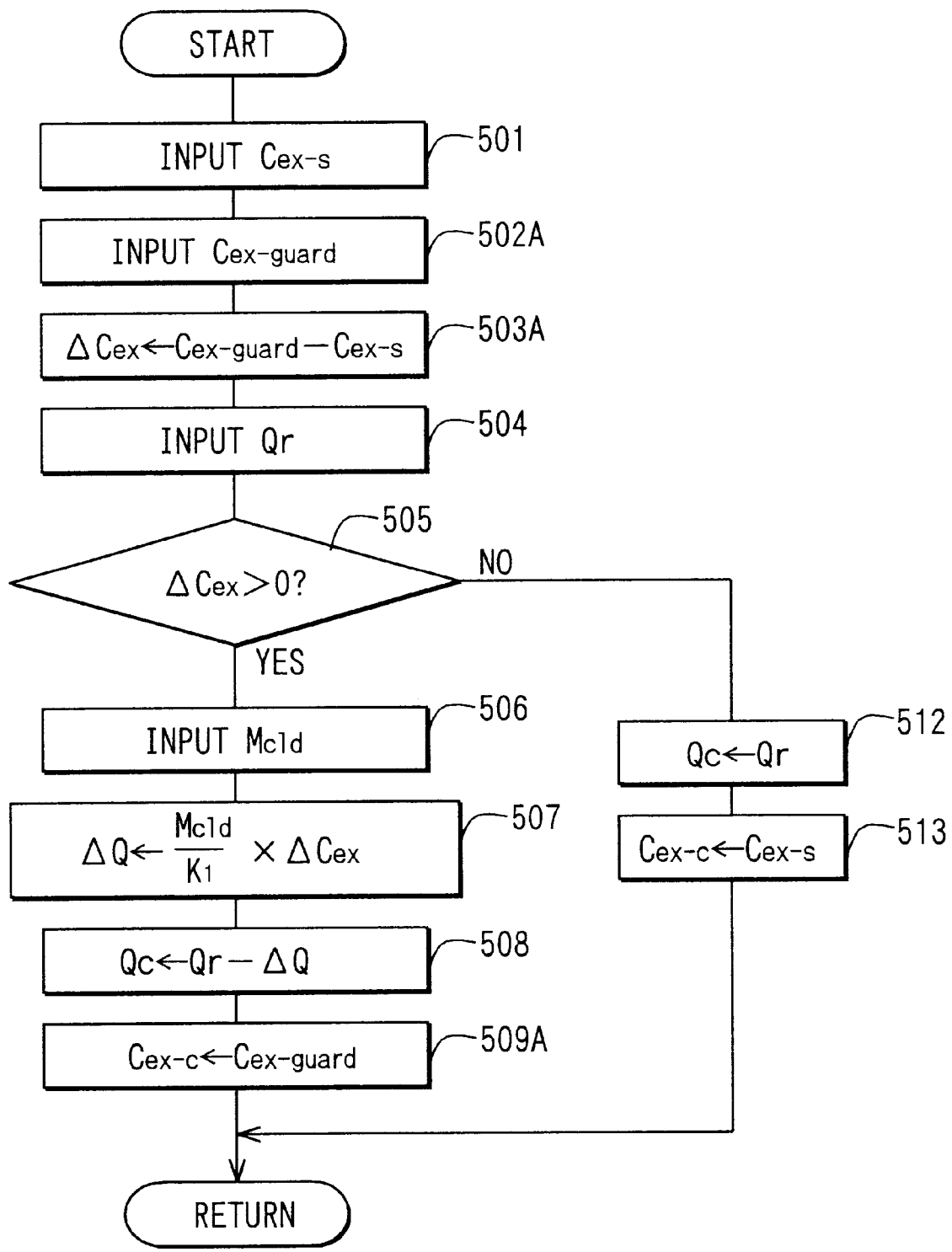
FIG. 24 is a flow chart showing a procedure for showing a correction of the injection amount of the second embodiment.

At Step 500A, this processing procedure (or subroutine) is shown in the flow chart of FIG. 24. What is changed from the first embodiment (of FIG. 13) is located at Steps 502A, 503A and 509A. Specifically, at Step 502A, the limit exhaust $O_2$ concentration Cex-guard determined at Step 400A is read, and at Step 503A, there is calculated the deviation ΔCex between the limit exhaust $O_2$ concentration Cex-guard and the estimated exhaust $O_2$ concentration Cex-s after learning.

If the ΔCex is larger than 0, at Step 509A, the limit exhaust $O_2$ concentration Cex-guard is then stored as the exhaust $O_2$ concentration Cex-c after the injection correction in the memory.

If ΔCex≦0, α (coefficient)=0. As a result, the injection amount is corrected only on the richer side than the limit exhaust $O_2$ concentration.

Figure 25:
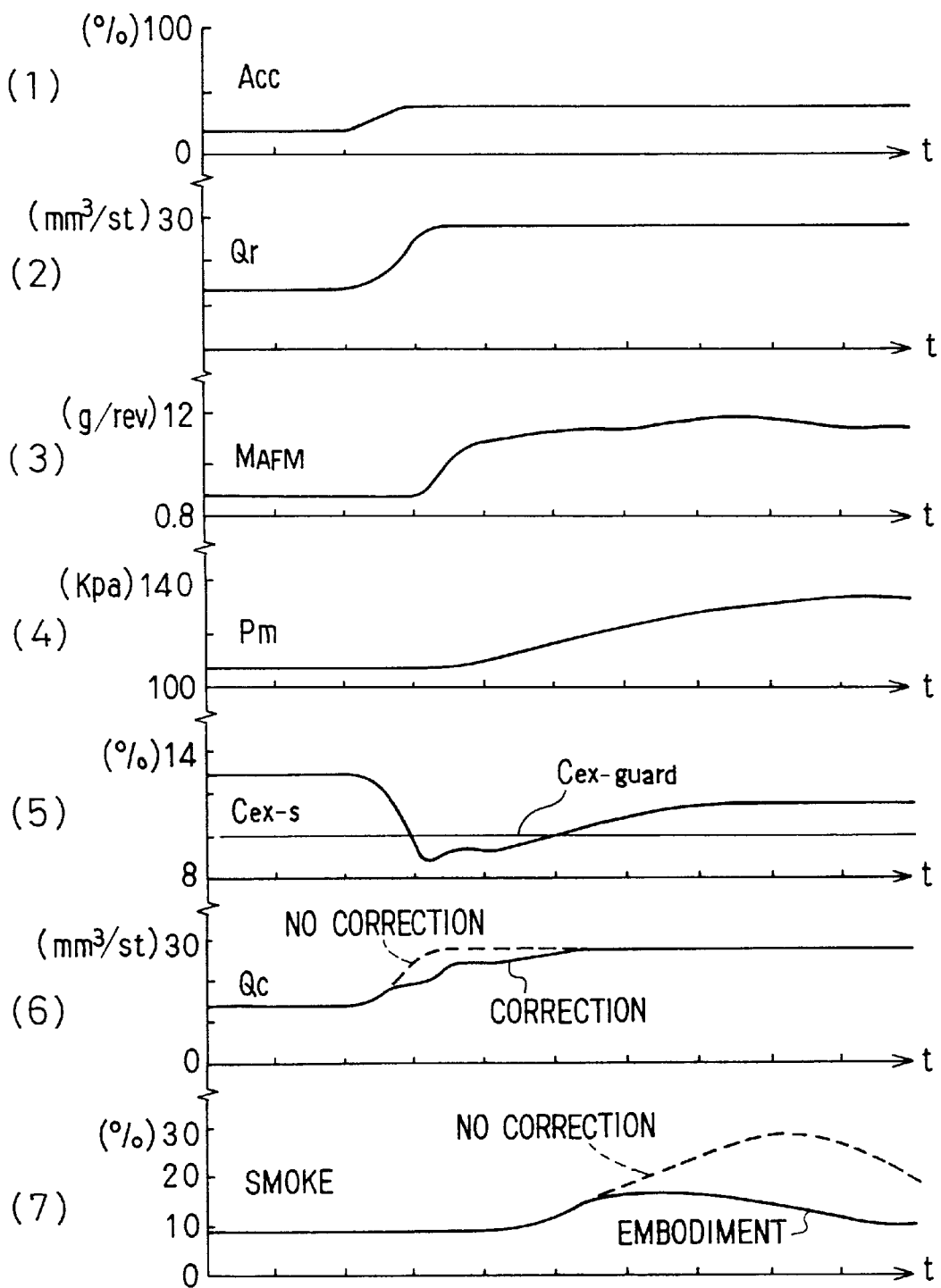
FIG. 25 is a time chart showing a control result of the second embodiment.

An example of the actions of the second embodiment is illustrated in FIG. 25.

Observed signals under the control of the embodiment are shown in FIG. 25. The first section (1) shows an operating degree of an accelerator Acc. The second section (2) shows the command injection amount Qr. The third section (3) shows the amount detected by the airflow meter. The fourth section (4) shows the intake pressure. The fifth section (5) shows the estimated exhaust $O_2$ concentration after learning correction. The sixth section (6) shows the injection amount after correction. The seventh section (7) shows the smoke amount.

In this action example, there is considered the case in which the accelerator operated to accelerate the engine. If the estimated exhaust $O_2$ concentration after learning goes to the richer side (or to the side of the lower exhaust $O_2$ concentration) than the limit exhaust $O_2$ concentration, the injection amount (6) is corrected so that the injection amount is made lower than that before correction. As a result, the smoke at the transient time can be made lower than that of the case in which the injection amount is not corrected.

Third Embodiment

The present embodiment is provided with filtering means for correcting the time delay till the exhaust $O_2$ concentration of the exhaust gas discharged from the cylinder is detected by the $O_2$ sensor 12.

Figure 26:
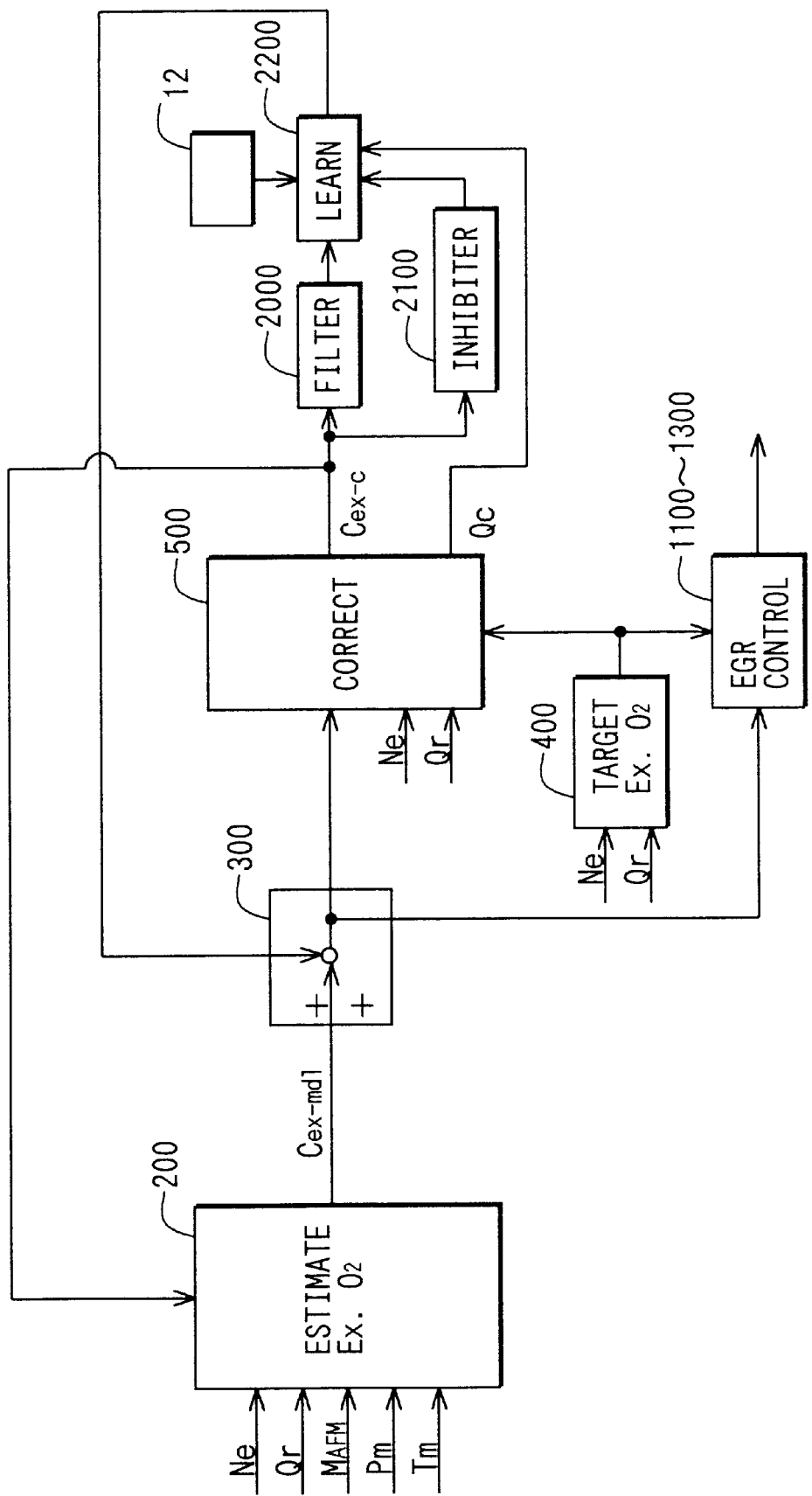
FIG. 26 is a block diagram showing control system according to a third embodiment of the present invention.

FIG. 26 is a block diagram showing the control contents of the ECU 13. This embodiment is modified by adding control blocks 2000 and 2100 to the first embodiment and by changing the contents of the learning calculations indicated by the control block 600 of the first embodiment, to replace it by a control block 2200.

Here, the control blocks 200 to 500 and 1100 to 1300 are identical to those of the first embodiment so that their description will be omitted.

First of all, the processing contents of the (filtering) control block 2000 will be described with reference to the flow chart shown in FIG. 27A.

At Step 2001, there is read the exhaust $O_2$ concentration Cex-c after the injection amount correction, as calculated at the aforementioned Step 500.

At Step 2002, the values Qc and Ne are read.

At Step 2003, a time constant TA and a dead time TB are determined from the map of Qc and Ne.

Here, the time constant TA and the dead time TB or the filtering elements are adjusted in advance for every running conditions of the engine 1. Here, the adjustment is within the limited range from the cylinder to the $O_2$ sensor 12 so that a highly precise adjustment can be achieved only by the filtering with the time constant TA and the dead time TB.

At Step 2004, the time constant TA and the dead time TB determined at Step 2003 are used to filter the time delay till the exhaust $O_2$ concentration of the exhaust gas discharged from the cylinder is detected by the $O_2$ sensor 12. Here is shown an example, in which the filter is done with the dead time and a delay of a first order.

Here, letters fA of Step 2004 designate a function for filtering with the time constant TA and the dead time TB, that is, a transmission function shown in FIG. 27B, for example.

Here will be described the processing contents of the control block 2100 (for deciding the learning inhibition) with reference to the flow chart shown in FIG. 28.

At Step 2101, there is read the exhaust $O_2$ concentration Cex-c after the injection amount correction.

At Step 2102, the read exhaust $O_2$ concentration Cex-c is differentiated. The manner for the differentiation can be substituted for a deviation in which the variation within a predetermined time period is divided by the time. However, the deviation is liable to cause noises, and the deviated value may be rounded.

At Step 2103, it is decided whether or not the absolute value |ΔCex-c| of the differential value determined at Step 2102 is larger than a predetermined value Cex-max. Here, this predetermined value Cex-max is determined by the filtering precision needed, as exemplified by 5%/s.

At Step 2104, if the value |Δcex-c| is larger than the predetermined value (that is, if the decision answer is YES), the filtering precision cannot be warranted so that a learning inhibiting flag is turned ON.

At Step 2105, if the value |ΔCex-c| is smaller than the predetermined value (that is, if the decision answer is NO), the learning inhibiting flag is turned OFF.

Figure 29:
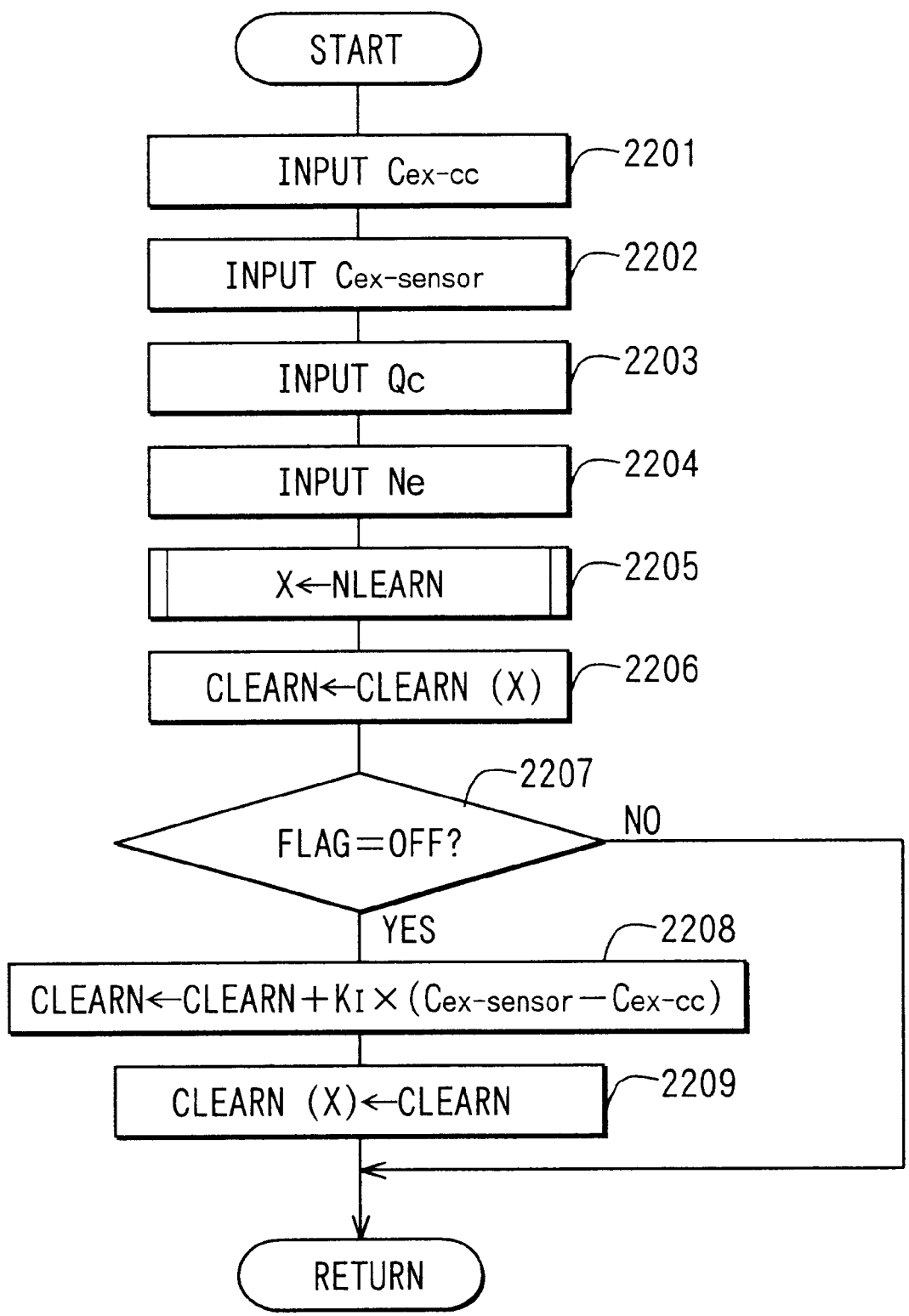
FIG. 29 is a flow chart showing a processing procedure of a learning calculation of the third embodiment.

Here will be described the processing contents of the control block 2200 (for learning calculations) with reference to the flow chart shown in FIG. 29.

At Steps 2201 to 2204, there are sequentially read the value Cex-cc filtered at Step 2004, the output value Cex-sensor of the $O_2$ sensor 12, and the values Qc and Ne.

At Step 2205, the learning region is decided from the map (as referred to FIG. 15).

At Step 2206, a learning value (or a learning correction) is read from the learning region.

At Step 2207, the learning inhibition flag is decided on the basis of the processed results of Steps 2104 and 2105.

At Step 2208, when the learning inhibition flag is OFF (that is, when the decision answer is YES), an integral lean is done from the measured value Cex-sensor of the exhaust $O_2$ concentration and the value Cex-cc (or the sensor position estimated exhaust $O_2$ concentration) after the filtering.

At Step 2209, the value integrally learned at Step 2208 is updated as a learning value CLEARN (X).

In the present embodiment, as has been described hereinbefore, the learning value is calculated from the comparison between the estimated exhaust $O_2$ concentration after the filtering and the output value of the $O_2$ sensor so that the highly precise learning control can be realized even at the transient time.

However, an error occurs in the filtering when the signal of the exhaust $O_2$ concentration abruptly changes. Under the condition in which the changing rate of the estimated exhaust $O_2$ concentration is no less than a predetermined value (that is, in case it is decided at Step 2103 that the value |Δcex-c| is higher than the predetermined value), therefore, the precision of the filtering cannot be warranted so that the learning in the transient state can be realized within a predetermined range by inhibiting the updating of the learning correction.

Fourth Embodiment

Figure 30A:
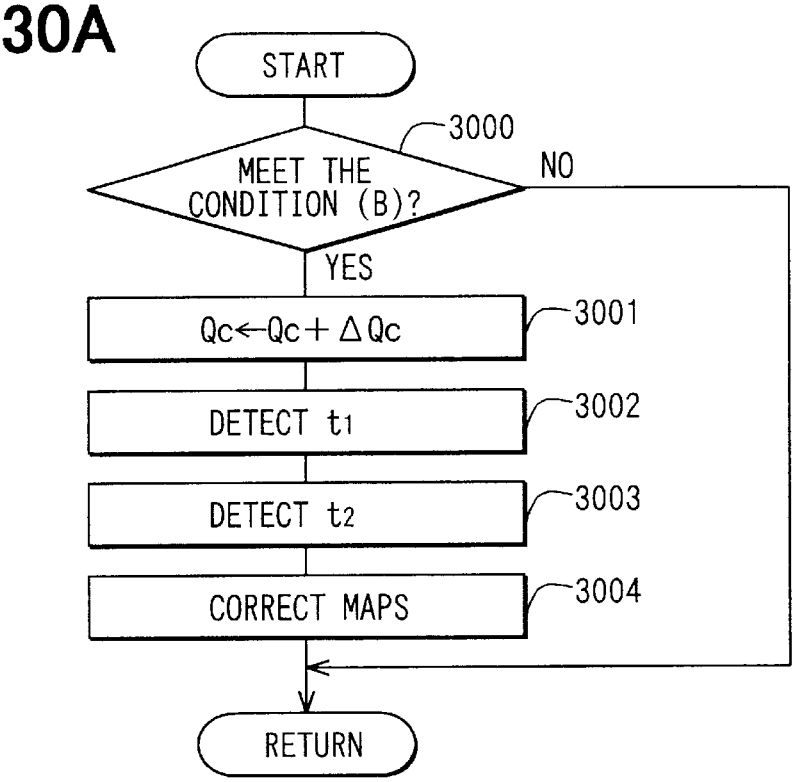
FIG. 30A is a flow chart showing a processing procedure for determining a dead time and a lapse time according to a fourth embodiment of the present invention.

The present embodiment exemplifies a method for detecting the dead time and the time constant till the exhaust gas discharged from the cylinder reaches the $O_2$ sensor 12, from the output value of the $O_2$ sensor 12 at the time when the injection amount is finely changed in the steady state. This processing procedure is shown in the flow chart of FIG. 30A.

Figure 30B:
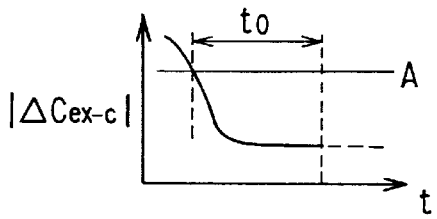
FIGS. 30B to 30E are explanatory diagrams of the fourth embodiment.

At Step 3000, the steady state is decided. This decision is made (as referred to FIG. 30B) depending on whether or not the aforementioned |Δcex-c| is no more than a predetermined value A for the predetermined time period t0. Another method may depend on that the changing width of the injection amount for a predetermined time period is within a predetermined value and that the changing width of the rotation speed is within a predetermined value.

Figure 30C:
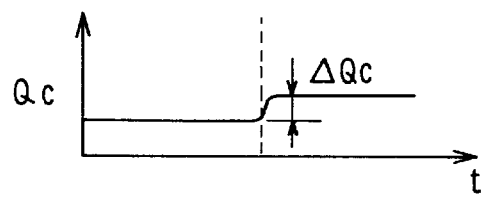

At Step 3001, the injection amount is augmented by a minute amount (as referred to FIG. 30C). Here, the augmentation affects the torque, if too much, and may be exemplified by 1 $mm^3$/st.

Figure 30D:
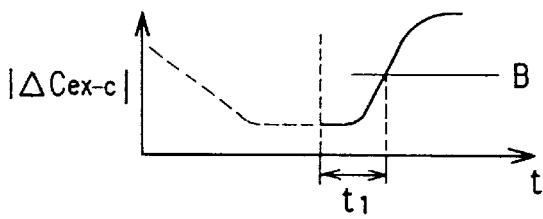

At Step 3002, there is detected (as referred to FIG. 30D) the lapse time t1 till the |Δcex-c| reaches a predetermined value B after the injection amount was augmented. This time t1 is a dead time till the change in the exhaust $O_2$ concentration in the cylinder due to the change in the injection amount is detected by the $O_2$ sensor 12.

Figure 30E:
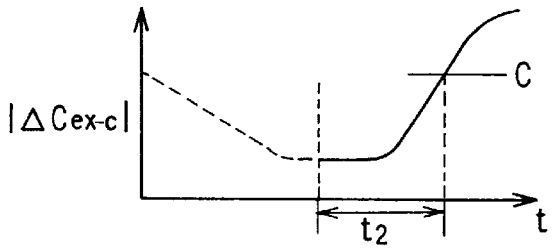

At Step 3003, there is detected (as referred to FIG. 30E) the lapse time t2 till the |Δcex-c| reaches a predetermined value C after the injection amount was augmented.

At Step 3004, the values of the time constant map and the dead time map, as adjusted in advance, are corrected from t2 and (t2−t1). The correcting method can be exemplified, although omitted, by a method using the ratio between the value of the dead time map and the value t1 as a correction coefficient. Here, the value (t2−t1) is a detection of the dead time of the $O_2$ sensor 12.

The filtering elements, i.e., the dead time and the time constant are adjusted in advance for the every running conditions of the engine 1 but are desired to be corrected during the drive because the engine 1 and the $O_2$ sensor 12 have dispersions. According to the method of the present embodiment, on the contrary, by changing the injection amount finely in the steady state to change the exhaust $O_2$ concentration finely, it is possible to detect how much delay the $O_2$ sensor 12 exhibits the reaction in. Therefore, the filtering precision can be improved, as exemplified in the third embodiment, to make a highly precise learning at the transient time.

Fifth Embodiment

Figure 31:
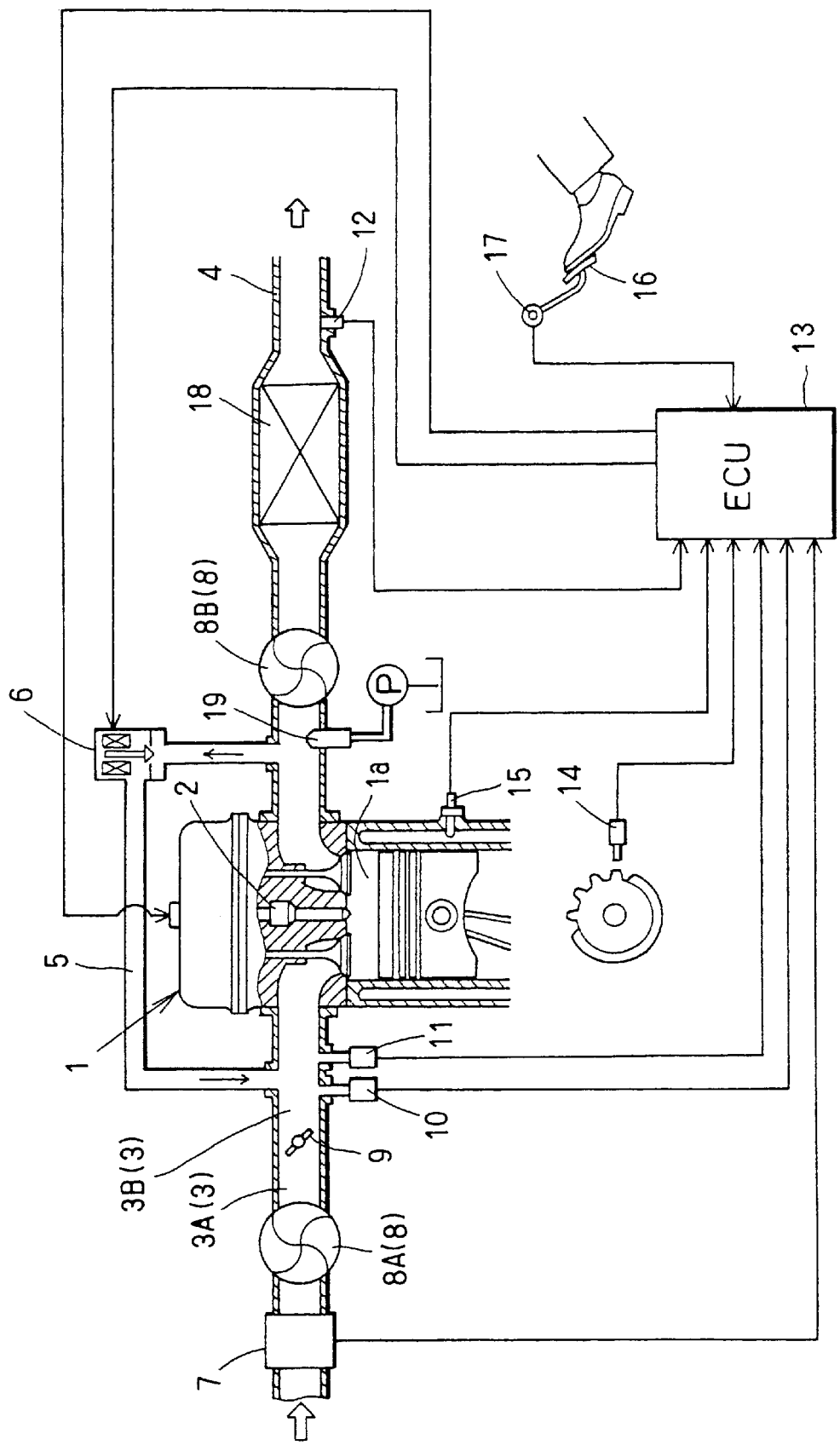
FIG. 31 is a schematically block diagram showing a control system of a Diesel engine according to a fifth embodiment of the present invention.

In the present embodiment, as shown in FIG. 31 the exhaust passage 4 is provided with a catalyst 18 or Diesel particulate filter, and the $O_2$ sensor 12 is disposed on the downstream side of the catalyst 18.

With the $O_2$ sensor 12 is disposed on the downstream side of the catalyst 18, this catalyst 18 acts as a pressure loss member to raise the pressure in the vicinity of the sensor. This pressure rise causes a problem that the detection precision of the $O_2$ sensor 12 drops.

In the present embodiment, on the contrary, the exhaust $O_2$ concentration is timely estimated in the high precision, and the filtering is executed to correct the delay from the cylinder to the $O_2$ sensor 12. Even if the $O_2$ sensor 12 is arranged on the downstream side of the catalyst 18, therefore, the output value of the $O_2$ sensor 12 can be highly precisely employed for the learning correction.

Sixth Embodiment

Figure 32:
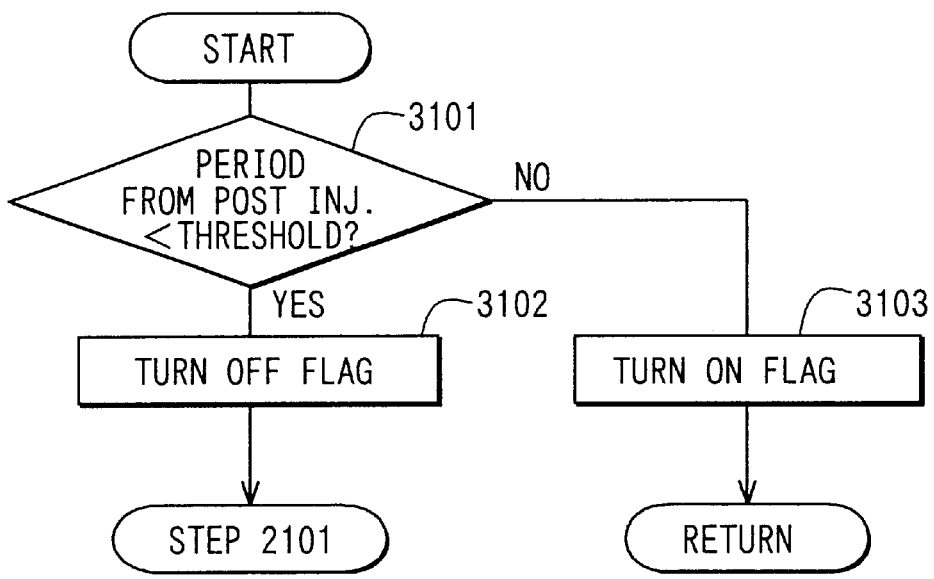
FIG. 32 is a flow chart showing a processing procedure according to a sixth embodiment of the present invention.

In the present embodiment, a post injection is executed for the catalytic control, and its processing procedure is shown in the flow chart of FIG. 32.

Here, the operations of this embodiment are executed at or before Step 2101 shown in FIG. 28 (i.e., between START and Step 2101).

At Step 3101, it is decided whether or not a predetermined period has elapsed after the post injection was executed.

At Step 3102, if the predetermined period elapses (i.e., if the decision answer is NO), the learning inhibition flag is turned OFF. Even after the end of the post injection, the unburned fuel left in the catalyst may continue its oxidization. Therefore, the learning precision is improved if the release (or OFF) of the learning inhibition flag is done when a predetermined period elapses after the end of the post injection.

At Step 3103, if the predetermined period does not elapse (i.e., if the decision answer is YES), the learning inhibition flag is turned ON.

Here, the present embodiment can also be applied to the case in which not the post injection but an addition the fuel exhaust pipe is done. In this addition to the fuel exhaust pipe, the fuel is added to the inside of the exhaust passage 4 from a fuel adding valve 19 disposed in the exhaust passage 4, as shown in FIG. 31.

If the post injection or the addition to the fuel exhaust pipe is thus executed, the fuel components may deteriorate the detection precision of the $O_2$ sensor 12. If the chemical reaction in the catalyst 18 is activated by the fuel addition so that the catalyst temperature rises to burn soot in the catalyst 18, moreover, the exhaust $O_2$ concentration near the $O_2$ sensor 12 becomes different from that at the time of discharging from the cylinder. As a result, the precision of the learning control is hard to retain. In the case of these catalytic controls, therefore, an erroneous learning can be prevented by inhibiting the updating the learning value (or learning correction) till a predetermined period elapses.

Seventh Embodiment

Figure 33:
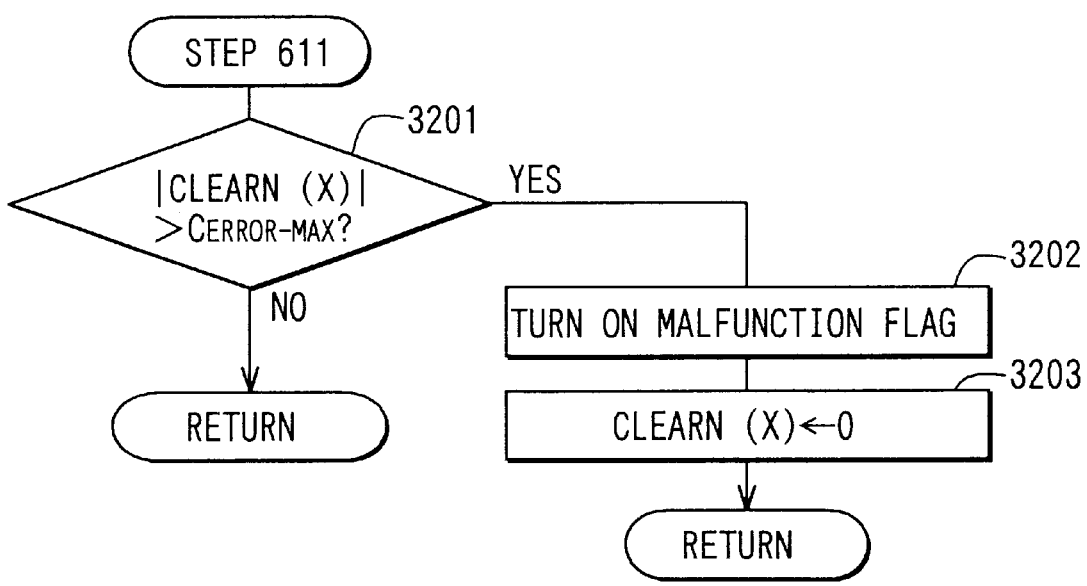
FIG. 33 is a flow chart showing a processing procedure of the sixth embodiment.

In the present embodiment, the learning correction is inhibited when it is decided on the basis of the absolute value of the learning value that the $O_2$ sensor 12 malfunctions. This processing procedure is shown in the flow chart of FIG. 33.

Here, the procedure of the present embodiment is executed subsequent to Step 611 shown in FIG. 14.

At Step 3201, it is decided whether or not the absolute value of the learning value updated at Step 611 is larger than a predetermined value C ERROR-MAX.

At Step 3202, if the absolute value of the learning value is larger than the predetermined value (or if the decision answer is YES), the $O_2$ sensor malfunction flag is turned ON.

At Step 3203, the learning value CLEARN (X) is reduced to zero so that it may not be reflected. The learning value may also be unreflected on the control block 300 shown in FIG. 26.

The $O_2$ sensor 12 has to hold its sensor element at a temperature as high as 600 to 800° C. so as to retain the detection precision. Moreover, the sensor element may be troubled or broken when covered with water. In these cases, there arises a problem that a mistaken value is learned. When the absolute value of the learning value is larger than the predetermined value, therefore, the malfunction of the $O_2$ sensor 12 is decided to inhibit the learning correction. However, the estimated exhaust $O_2$ concentration contains a model error but is warranted for a precision. As a result, the control can be realized with the estimated model value even if the learning correction is inhibited by the malfunction of the $O_2$ sensor 12. It is, therefore, possible to prevent any serious influence from being exerted upon the EGR control or the injection control using the exhaust $O_2$ concentration.

In the foregoing embodiments, the present invention has been applied to the Diesel engine 1 but could be applied to a gasoline engine having the EGR system.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. A control system for an internal combustion engine having an EGR system to recirculate a portion of exhaust gas to intake, comprising:

intake measuring means for measuring an amount of intake air to be sucked into an intake passage;

an intake pressure sensor for detecting an intake pressure in said intake passage;

command injection amount calculating means for calculating a command injection amount on the basis of at least a operational state of said internal combustion engine;

exhaust $O_2$ concentration estimating means for estimating an exhaust $O_2$ concentration of each combustion in a cylinder by using an intake airflow signal outputted from said intake measuring means, an intake pressure signal outputted from said intake pressure sensor, and command injection amount information calculated by said command injection amount calculating means; and means for controlling at least one of an EGR valve of said EGR system and a fuel injection amount in accordance with the estimated exhaust $O_2$ concentration estimated by said exhaust $O_2$ concentration estimating means.

2. The control system for an internal combustion engine according to claim 1, wherein said exhaust $O_2$ concentration estimating means includes consumed $O_2$ amount calculating means for calculating an $O_2$ amount to be consumed in terms with said command injection amount.

3. The control system for an internal combustion engine according to claim 1, wherein said exhaust $O_2$ concentration estimating means calculates the $O_2$ amount in the exhaust gas by using an $O_2$ amount in the fresh air sucked into said intake passage and an $O_2$ amount in the EGR gas.

4. The control system for an internal combustion engine according to claim 3, wherein said exhaust $O_2$ concentration estimating means calculates the $O_2$ amount in said EGR gas by using the estimated value of the past exhaust $O_2$ concentration calculated beforehand.

5. The control system for an internal combustion engine according to claim 1, further comprising:
   an $O_2$ sensor disposed in an exhaust passage for detecting the actual exhaust $O_2$ concentration; and
   learning means for controlling the estimated value of said exhaust $O_2$ concentration so that the estimated value may coincide with the output value of said $O_2$ sensor.

6. The control system for an internal combustion engine according to claim 1, further comprising:
   an $O_2$ sensor disposed in an exhaust passage for detecting the actual exhaust $O_2$ concentration;
   filtering means for correcting a time delay till the exhaust $O_2$ concentration of the exhaust gas discharged from said cylinder is detected by said $O_2$ sensor; and
   learning means for calculating a learning correction so that the estimated value of said exhaust $O_2$ concentration may coincide with the output value of said $O_2$ sensor, after filtered by said filtering means, to correct the estimated value of said exhaust $O_2$ concentration with the learning correction.

7. The control system for an internal combustion engine according to claim 6, wherein the updating of said learning correction is inhibited under the condition in which the changing rate of said estimated exhaust $O_2$ concentration is no less than a predetermined value.

8. The control system for an internal combustion engine according to claim 6, wherein the dead time and the time constant till the exhaust gas discharged from said cylinder reaches said $O_2$ sensor are detected from the output value of said $O_2$ sensor when the injection amount in a steady state is finely changed.

9. The control system for an internal combustion engine according to claim 6, wherein said exhaust passage is provided with a catalyst, and wherein said $O_2$ sensor is disposed on the downstream side of said catalyst.

10. The control system for an internal combustion engine according to claim 6, wherein the updating of said learning correction is inhibited when an addition of the fuel to an exhaust pipe or a post injection for the catalyst control is done.

11. The control system for an internal combustion engine according to claim 6, wherein when the absolute value of said learning correction is no less than a predetermined value, said $O_2$ sensor is decided to be malfunctioning.

12. The control system for an internal combustion engine according to claim 11, wherein when the malfunction of said $O_2$ sensor is decided, the learning correction by said learning means is inhibited.

13. The control system for an internal combustion engine according to claim 1, further comprising:
   EGR control means for feedback-controlling said EGR valve so that the estimated value of said exhaust $O_2$ concentration may coincide with said target value, the means having a target value of the exhaust $O_2$ concentration for each driving region of said internal combustion engine.

14. The control system for an internal combustion engine according to claim 1, wherein said command injection amount is corrected by re-calculating the injection amount so that the estimated value of said exhaust $O_2$ concentration at the calculating time using said command injection amount may coincide with a predetermined target value.

15. The control system for an internal combustion engine according to claim 1, wherein said command injection amount is set with an upper limit so that the estimated value of said exhaust $O_2$ concentration at the calculating time using said command injection amount may not exceed a predetermined limit value on the rich side.

16. The control system for an internal combustion engine according to claim 15, wherein said limit value on the rich side is a function of at least a rotating speed of said internal combustion engine.

* * * * *